(12) United States Patent
Hel-Or et al.

(10) Patent No.: US 7,184,595 B2
(45) Date of Patent: Feb. 27, 2007

(54) PATTERN MATCHING USING PROJECTION KERNELS

(75) Inventors: Hagit Hel-Or, Zikhron Yacov (IL); Yacov Hel-Or, Zikhron Yacov (IL)

(73) Assignee: Carmel-Haifa University Economic Corporation Ltd., Haifa (IL)

( * ) Notice: Subject to any disclaimer, the term of this patent is extended or adjusted under 35 U.S.C. 154(b) by 682 days.

(21) Appl. No.: 10/327,997

(22) Filed: Dec. 26, 2002

(65) Prior Publication Data

US 2004/0126016 A1    Jul. 1, 2004

(51) Int. Cl.
*G06K 9/68* (2006.01)

(52) U.S. Cl. .................................... 382/218; 382/283

(58) Field of Classification Search ................ 382/135, 382/199, 218, 209, 217, 283; 702/181, 189; 706/17, 20, 31
See application file for complete search history.

(56) References Cited

U.S. PATENT DOCUMENTS

| | | | | |
|---|---|---|---|---|
| 5,164,992 | A * | 11/1992 | Turk et al. | 382/118 |
| 5,276,771 | A * | 1/1994 | Manukian et al. | 706/25 |
| 5,459,482 | A * | 10/1995 | Orlen | 345/98 |
| 6,278,799 | B1 * | 8/2001 | Hoffman | 382/159 |
| 6,553,136 | B1 * | 4/2003 | Keshet et al. | 382/135 |
| 6,895,116 | B2 * | 5/2005 | Yen et al. | 382/199 |
| 6,947,869 | B2 * | 9/2005 | Palmadesso et al. | 702/181 |
| 6,963,671 | B2 * | 11/2005 | Frisken et al. | 382/285 |
| 7,054,468 | B2 * | 5/2006 | Yang | 382/118 |
| 7,054,492 | B2 * | 5/2006 | Lee et al. | 382/216 |
| 2004/0081360 | A1 * | 4/2004 | Lee et al. | 382/209 |
| 2004/0101199 | A1 * | 5/2004 | Lee et al. | 382/209 |
| 2004/0126016 | A1 * | 7/2004 | Hel-Or et al. | 382/218 |

OTHER PUBLICATIONS

Yong-Sheng Chen et al., Fast Block Matching Algorithm Based on the Winner-Update Strategy, IEEE Transactions on Image Processing, vol. 10, No. 8, Aug. 2001, pp. 1212-1222.

W. Li et al., Successive Elimination Algorithm for Motion Estimation, IEEE Transactions on Image Processing, vol. 4, No. 1, Jan. 1995, pp. 105-107.

Chang-Hsing Lee et al., A Fast Motion Estimation Algorithm Based on the Block Sum Pyramid, IEEE Transactions on Image Processing, vol. 6, No. 11, Nov. 1997, pp. 1587-1591.

X.Q. Gao, et al., A Multilevel Successive Elimination Algorithm for Block Matching Motion Estimation, IEEE Transactions on Image Processing, vol. 9, No. 3, Mar. 2000, pp. 501-504.

D.I. Barnea, et al., A Class of Algorithms for Fast Digital Image Registration, IEEE Transactions on Computers, vol. e-21, No. 2, Feb. 1972, pp. 179-186.

\* cited by examiner

*Primary Examiner*—Gregory Desire

(57) ABSTRACT

Pattern matching apparatus for comparing signal samples with a pattern to find signal samples substantially matching said pattern, the apparatus comprising: a projector for projecting said signal samples over a tree of projection vectors of successively increasing frequency at nodes of said tree to successively provide projection values, a distance measurer, associated with an output of said projector for determining a distance between a projection value and a corresponding projection value of said pattern, said distance being an expression of a minimum bound of a true distance between said sample and said pattern, and a thresholder, associated with an output of said distance measurer for applying a threshold to said minimum bound to successively reject samples at respective nodes.

33 Claims, 23 Drawing Sheets

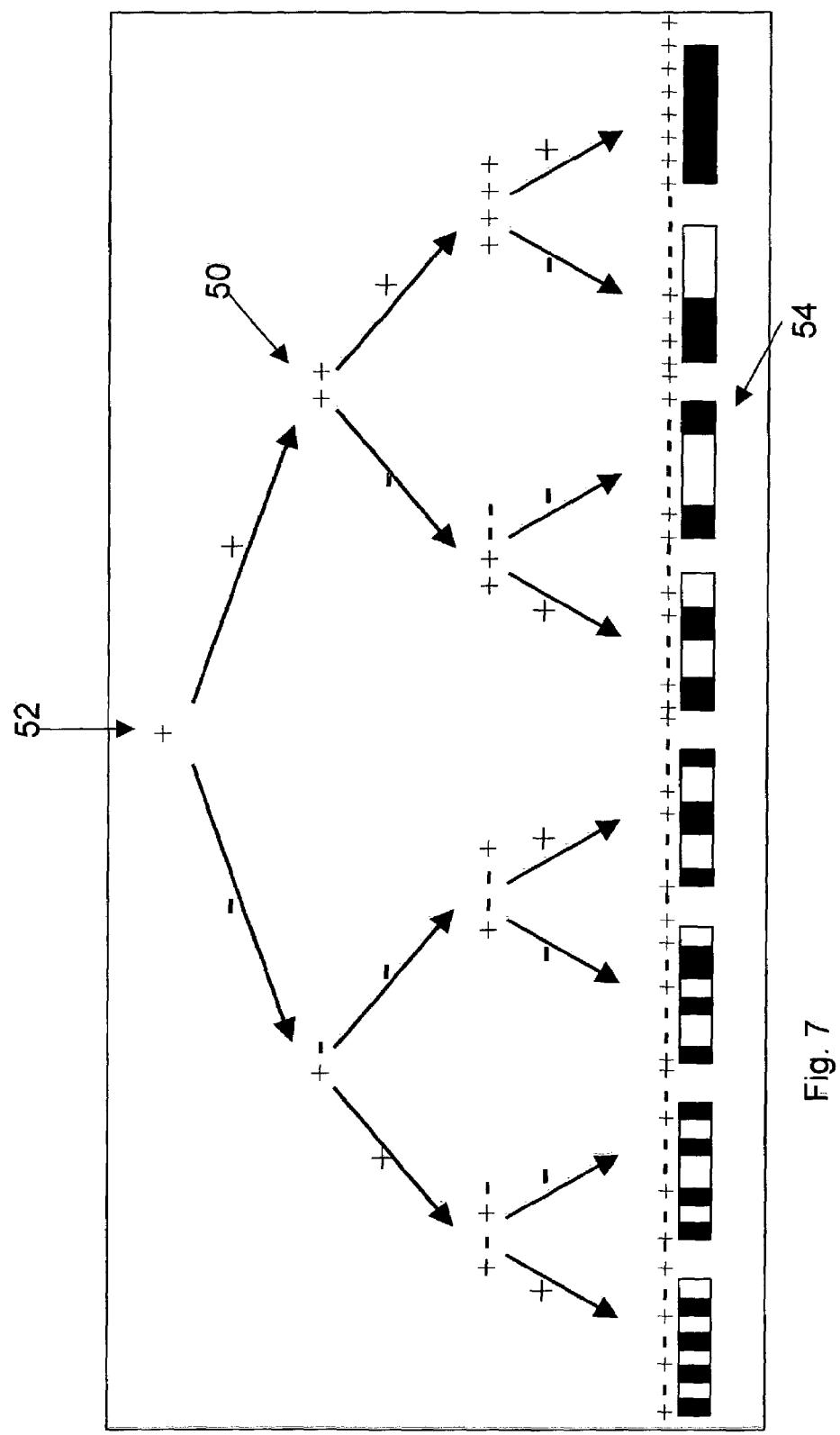

Fig. 11b
Fig. 11c
Fig. 11
Fig. 11a

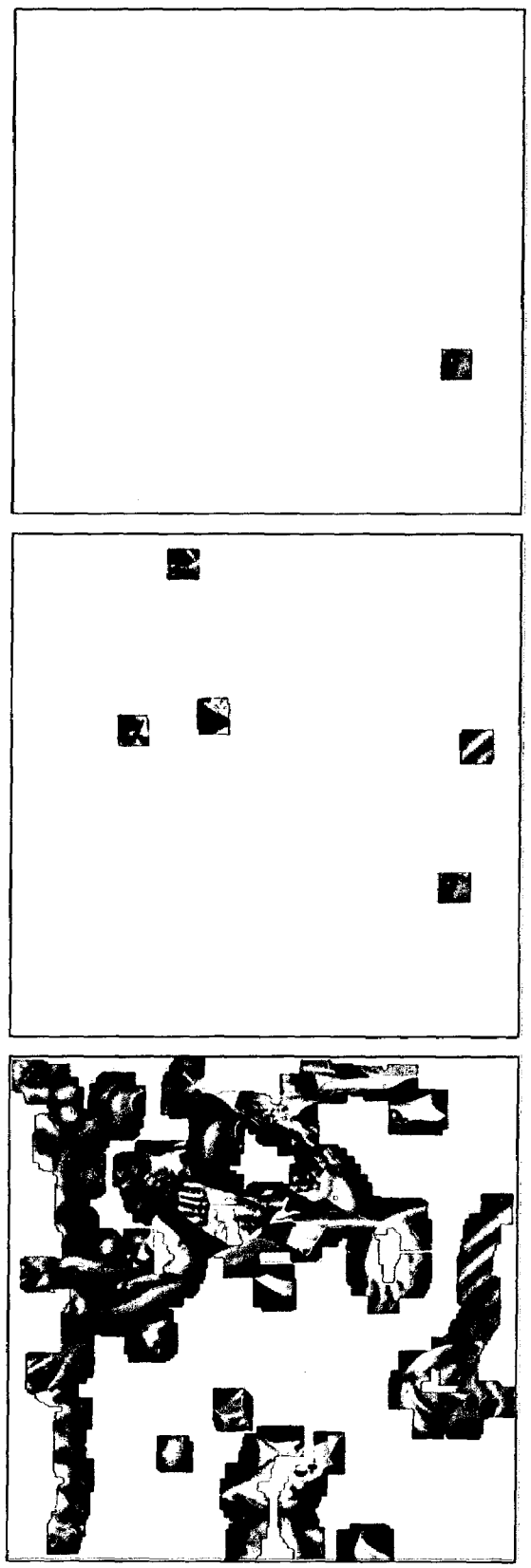

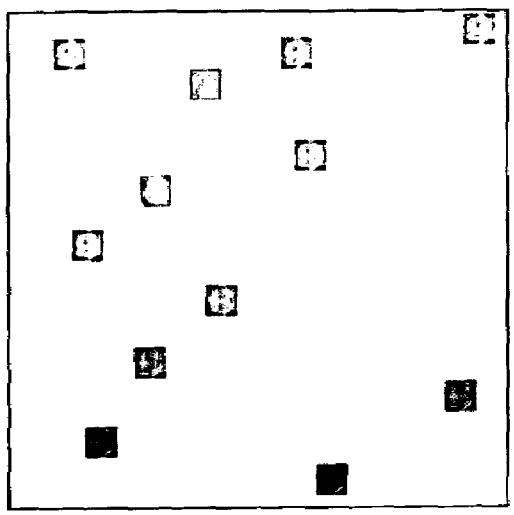
Fig. 21

PATTERN MATCHING USING PROJECTION KERNELS

FIELD AND BACKGROUND OF THE INVENTION

The present invention relates to image analysis and, more particularly, but not exclusively to pattern matching using projection kernels in order to achieve real time results.

Many applications in Image Processing and Computer Vision require finding a particular pattern in an image. This task is referred to as Pattern Matching and may appear in various forms. Some applications require detection of a set of patterns in a single image, for instance, when a pattern appears under various transformations, or when several distinct patterns are sought in the image. Other applications require finding a particular pattern in several images. The pattern is typically a 2D image fragment which is much smaller than the image. In video applications, a pattern may also take the form of a 3D spatio-temporal fragment, representing a collection of 2D patterns over a succession of frames.

Finding a given pattern in an image is typically performed by scanning the entire image, and evaluating the similarity between the pattern and a local 2D window about each pixel. In video pattern matching, the similarity is calculated for each pixel in the 3D spatio-temporal stack, where the distance is calculated between two 3D data cubes. Reference is herein made to FIG. 3 below which shows pattern matching in 2D and in 3D: For each pixel location, a local neighborhood is compared with the given pattern.

There are various measures of similarity that may be used in this scheme and it is arguable as to which measure is preferable (see references [19, 17, 21, 2] as listed at the end of the background for reviews and discussions). One of the more common approaches is to assume that the similarity measure is a norm distance, specifically, the Euclidean distance. Given two images $I_1(x; y)$ and $I_2(x; y)$, the Euclidean distance between them is evaluated by:

$$d_E(I_1, I_2) = \|I_1(x, y) - I_2(x, y)\| = \sqrt{\left(\sum_{x,y} [I_1(x, y) - I_2(x, y)]^2\right)}$$

There is a strong argument against the Euclidean distance as an image similarity metric in that it does not take into account the 2D topology of an image and it is not in accord with human perception [10, 8, 18, 24]. However there is an advantage in using this measure since it allows the naive calculations to be greatly reduced by introducing a convolution scheme. This significantly reduces complexity and runtime. Another reason for the popularity of the Euclidean distance is the ability to reduce the representation of linear spaces using Principle Component Analysis (PCA) approaches These approaches are helpful when a set of patterns are sought in an image. Using PCA in such cases, it is possible to efficiently represent the pattern space using a small number of pattern basis vectors, so that the complexity of the search process can be reduced significantly (see e.g. [3]). In the embodiments described hereinbelow we deal with Euclidean distance, however, the general scheme is applicable to any distance measure that forms a norm. The Euclidean distance is merely a particular case thereof The Euclidean Distance and its Complexity Assuming a given 2D k×k pattern $P(x; y)$ is to be matched within an image $I(x; y)$ whose dimensions are n×n. In principle, for each pixel location $(x; y)$ in the image, the following distance measure is calculated:

$$d_E^2(I_1, I_2)_{x,y} = \sum_{\{i,j\}=0}^{k-1} (I(x+i, y+j) - P(i, j))^2 \qquad (2.1)$$

The smaller the distance measure at a particular location, the more similar the k×k local window is to the given pattern. If the distance is zero, the local window is identical to the pattern. In principle, the distance of eqn. (2.1) is calculated for each pixel location in the image, hence it must be applied $n^2$ times, with $k^2$ multiplications and $2k^2$ additions at each step. Fortunately, this naive approach can be expedited using the FFT transform together with exploitation of the convolution theorem. The Euclidean distance defined above can be re-written as:

$$d_E^2(I_1, I_2)_{x,y} = \sum_{\{i,j\}=0}^{k-1} (I^2(x+i, y+j) - P^2(i, j) - 2I(x+i, y+j)P(i, j))$$

The first term over all pixel locations, can be calculated by applying a convolution between the squared image $I^2(x; y)$ and a k×k mask of ones. The second term is fixed for each $(x; y)$ and can be calculated only once. The third term can be calculated by applying a convolution between the k×k pattern and the image $I(x; y)$. Since convolution can be applied rapidly using FFT, it can be shown that the number of operations that are required for calculating the distance measure is 36 log n additions and 24 log n multiplications, for each pixel of the image. Table 1 summarizes the number of operations for each approach in the case where a pattern of 32×32 pixels is sought in a 1K×1K image. Run times are for a Pentium III, 1.8 GHz machine. Note, that in the naive approach the operations are generally calculated using integer arithmetic, while for the Fourier approach calculations must be performed using floating point operations. Despite this, the Fourier approach performs better, and as the pattern size increases, the Fourier approach becomes more advantageous. Actual run times for this pattern matching case are given in table 1 and in more detail in the Results Section hereinbelow.

The run times obtained for patterns and images of reasonable size, are still long for most real time applications. To improve run times, heuristics are introduced such as reducing the search space by assuming a priori probability on the location of the pattern within the image. Another common approach uses multiresolution schemes to quickly search for the pattern in low resolution versions of the image and then estimate the location of the pattern at higher resolutions [1, 6, 15].

TABLE 1

A comparison between naïve and Fourier pattern matching approaches for a 32 × 32 pattern sought in a 1K × 1K image.

|  | Naïve | Fourier |
| --- | --- | --- |
| Average # operations per pixel | +: $2k^2$<br>*: $k^2$ | +: 36 log n<br>*: 24 log n |

TABLE 1-continued

A comparison between naïve and Fourier pattern matching approaches for a 32 × 32 pattern sought in a 1K × 1K image.

|  | Naïve | Fourier |
|---|---|---|
| Space | $n^2$ | $n^2$ |
| Integer Arithmetic | Yes | No |
| Run Time for PIII, 1.8 GHz | 4.86 Sec | 3.5 Sec |

There is thus a widely recognized need for, and it would be highly advantageous to have, a method of pattern matching which reduces calculation complexity and at the same time does not compromise the precision of the results.

Reference is herein made to the following documents in relation to different features of relevance to the present invention. The documents are hereby incorporated by reference into the present disclosure.

[1] E. H. Adelson, C. H. Anderson, J. R. Bergen, P. J. Burt, and J. M. Ogden. Pyramid methods in image processing. RCA Engineer, 29(6):33–41, 1984.

[2] A. J. Ahumada. Computational image quality metrics: A review. In Society for Information Display International Symposium, volume 24, pages 305–308, 1998.

[3] S. Baker, S. K. Nayar, and H. Murase. Parametric feature detection. International Journal of Computer Vision, 27:27–50, 1998.

[5] F. Crow. Summed-area tables for texture mapping. SIGGRAPH, 18(3):207–212, 1984.

[6] J. Crowley and A. Sanderson. Multiple resolution representation and probabilistic matching of 2-d grey scale shape. IEEE Transactions on Pattern Analysis and Machine Intelligence, 8:113–121, 1987.

[7] M. Elad, Y. Hel-Or, and R. Keshet. Pattern detection using maximal rejection classifier. In IWVF4-4$^{th}$ International Workshop on Visual Form, pages 28–30, Capri, Italy, May 2000.

[8] A. M. Eskicioglu and P. S. Fisher. Image quality measures and their performance. IEEE Trans-actions on Communication, 43(12):2959–2965, 1995.

[9] Y. Gil and M. Werman. Computing 2d min, max and median filters. IEEE Transactions on Pattern Analysis and Machine Intelligence, 15:504–507, 1993.

[10] B. Girod. What's wrong with mean-squared error? In A. B. Watson, editor, Digital Images and Human Vision, chapter 15, pages 207–220. MIT press, 1993.

[11] G. H. Golub and C. F. Van Loan. Matrix Computations. The John Hopkins University Press, Baltimore, Md., 1989.

[12] D. Keren, M. Osadchy, and C. Gotsman. Antifaces: A novel, fast method for image detection. IEEE Transactions on Pattern Analysis and Machine Intelligence, 23(7):747–761, 2001.

[13] H. Kitajima. Energy packing efficiency of the hadamard transform. IEEE Transactions on Communication, pages 1256–1258, 1976.

[14] M. H. Lee and M. Kaveh. Fast hadamard transform based on a simple matrix factorization. IEEE Transactions on Acoustics, Speech and Signal Processing, 34(6):1666–1667, 1986.

[15] W. J. MacLean and J. K. T. Tsotsos. Fast pattern recognition using gradient-descent search in an image pyramid. In Proceedings of the 15 International Conference on Pattern Recognition, pages 877–881, 2000.

[16] B. Porat. A Course in Digital Signal Processing. John Wiley and Sons, NY, 1979.

[17] J. Puzicha, Y. Rubner, C. Tomasi, and J. M. Buhmann. Empirical evaluation of dissimilarity measures for color and texture. In IEEE International Conference on Computer Vision, pages 1165–1172, 1999

[18] R. Russel and P. Sinha. Perceptually-based comparison of image similarity metrics. Technical Report Al Memo 2001-14, MIT Artificial Intelligence Laboratory, 2001.

[19] S. Santini and R. Jain. Similarity measures. IEEE Transactions on Pattern Analysis and Machine Intelligence, 21(9):871–883, 1999.

[20] J. L. Shanks. Computation of the fast walsh-fourier transform. IEEE Transactions on Computers, C 18:457–459, 1969.

[21] D. A. Silverstein and J. E. Farrell. Quantifying perceptual image quality. In The Society for Imaging Science and Technology, Image processing quality and capture, 1998.

[22] Carl Staelin. Personal communication, 2002.

[23] D. Sundararajan and M. O. Ahmad. Fast computation of the discrete walsh and hadamard transforms. IEEE Transactions on Image Processing, 7(6):898–904, 1998.

[24] P. C. Teo and D. J. Heeger. Perceptual image distortion. In Proceedings of the First IEEE International Conference on Image Processing, volume 2, pages 982–986, 1994.

[25] P. Viola and M. Jones. Robust real-time object detection. In ICCV Workshop on Statistical and Computation Theories of Vision, Vancouver Canada, July 2001.

[26] J. Kane W. K. Pratt and H. C. Andrews. Hadamard transform image coding. Proceedings IEEE, 57(1):58–68, 1969.

SUMMARY OF THE INVENTION

According to one aspect of the present invention there is provided pattern matching apparatus for comparing signal samples with a pattern to find signal samples substantially matching the pattern. The apparatus comprises:

a projector for projecting the signal samples. One possibility for projecting uses a tree of projection vectors of successively increasing frequency at nodes of the tree to successively provide projection values, a distance measurer, associated with an output of the projector for determining a distance between the projection value and a corresponding projection value of the pattern, the distance being an expression of a minimum bound of a true distance between the sample and the pattern, and a thresholder, associated with an output of the distance measurer for applying a threshold to the minimum bound to successively reject samples at respective nodes.

Preferably, the tree of projection vectors comprises successively mutually orthogonal vectors.

Preferably, the tree of projection vectors comprises a branched arrangement of nodes extending from a root, such that nodes are arranged to have parent nodes and child nodes, each node representing a different projection, and wherein the projector comprises a memory for storing projections associated with a branch of the tree.

Preferably, the tree is configured to describe a Walsh Hadamard transformation but may be other transforms such as Haar etc.

Preferably, the projector is configured to recursively descend the tree from root to leaf, skipping nodes that have already been computed.

Preferably, the projector is configured to recursively ascend the tree from a node for which a projection is required to the root to restrict calculations to signal values needed for the node for which a projection is required.

Preferably, the projection vectors are one-dimensional projection vectors.

Preferably, the projection vectors are two-dimensional projection vectors.

Preferably, the projection vectors are at least three-dimensional projection vectors.

Preferably, the matching comprises incorporating noise tolerance, thereby to match a noisy signal to the pattern.

Preferably, the tolerance to noise is provided by increasing the threshold level in the thresholder.

Preferably, the distance measurer is configured to calculate a direct distance between the signal sample and the pattern when the signal sample is one of a small percentage of remaining samples following rejection of all other samples.

Preferably, the distance measurer is configured to use a Euclidian distance calculation.

Preferably, the distance measurer is configured to use an $L_2$ norm distance calculation.

Preferably, the distance measurer is configured to use an $L_1$ norm distance calculation.

Additionally or alternatively, the distance measurer is configured to use any normed distance calculation.

Preferably, a first branch of the tree comprises DC level information, and wherein the projector is configurable to skip the first branch in order to disregard the DC level information in the pattern matching.

Preferably, the projector is configurable to calculate projection values or minimum distance bounds for a subset of signal samples and to use the calculated values to provide estimates of projection values or minimum distance bounds for signal samples that neighbor samples within the subset.

According to a second aspect of the present invention there is provided a method of matching between a pattern and at least part of an input signal comprising:

projecting the pattern onto a first projection vector to form a pattern projection value;

projecting at least part of an input signal onto the first projection vector to form an input signal projection value;

calculating a distance between the pattern projection value and the input signal projection value; and rejecting at least part of an input signal as a non-match if the distance exceeds a predetermined threshold.

The method preferably comprises:

taking a non-rejected part of the input signal, projecting the pattern and the non-rejected part of the input signal onto a second projection vector to the first projection vector, to form a second pattern projection value and a second input signal projection value;

calculating a distance between the pattern projection value and the input signal projection value; and rejecting the non-rejected part of an input signal as a non-match if the distance exceeds a predetermined threshold.

The method preferably comprises repeating the above stages a predetermined number of times or until the number of remaining un-rejected windows reaches a predefined value.

The method preferably comprises taking a plurality of windows of the input signal and projecting all of the windows together onto the projection vector to calculate a projection value and a distance for each window, thereby to reject any window having a distance exceeding the predetermined threshold.

Preferably, the projection vectors comprise Walsh Hadamard basis vectors arranged in order of successively increasing frequency. Projection vectors may be other basis vectors as well, e.g. Haar basis vectors.

Preferably, the input signal is a one-dimensional signal and the projection vectors are one-dimensional basis vectors.

Preferably, the input signal is a two-dimensional image and the projection vectors are two-dimensional basis vectors.

Preferably, the input signal is a three-dimensional image and the projection vectors are three-dimensional basis vectors.

Preferably, the input signal is at least a four-dimensional signal and the projection vectors are at least four-dimensional basis vectors.

Preferably, the projection vectors are arranged in a tree structure having branches and nodes such that projection vectors share branches and nodes of the tree structure, the arrangement representing projection calculations, such that respective shared nodes of the tree structure allow sharing of projection calculations between projection vectors.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer or a number of computers using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6 is a simplified diagram showing the lower bound on the distance between image pattern and window as a percentage of the total distance, against a number of projection kernels being used.

FIG. 7 is a simplified tree diagram showing a tree scheme for computing projections of windows of a ID signal onto all Walsh Hadamard Kernels of order 8;

FIG. 11 is a diagram showing a 2D image for use as an input to a pattern matching experiment, and a pattern it is intended to match;

FIG. 12 shows projection stages in matching the pattern and image of FIG. 11;

FIG. 21 is a set of four images, illustrating pattern matching according to the preferred embodiments under varying illumination conditions over the image, that is to say DC invariant pattern Matching.

DESCRIPTION OF THE PREFERRED EMBODIMENTS

Figure 1:
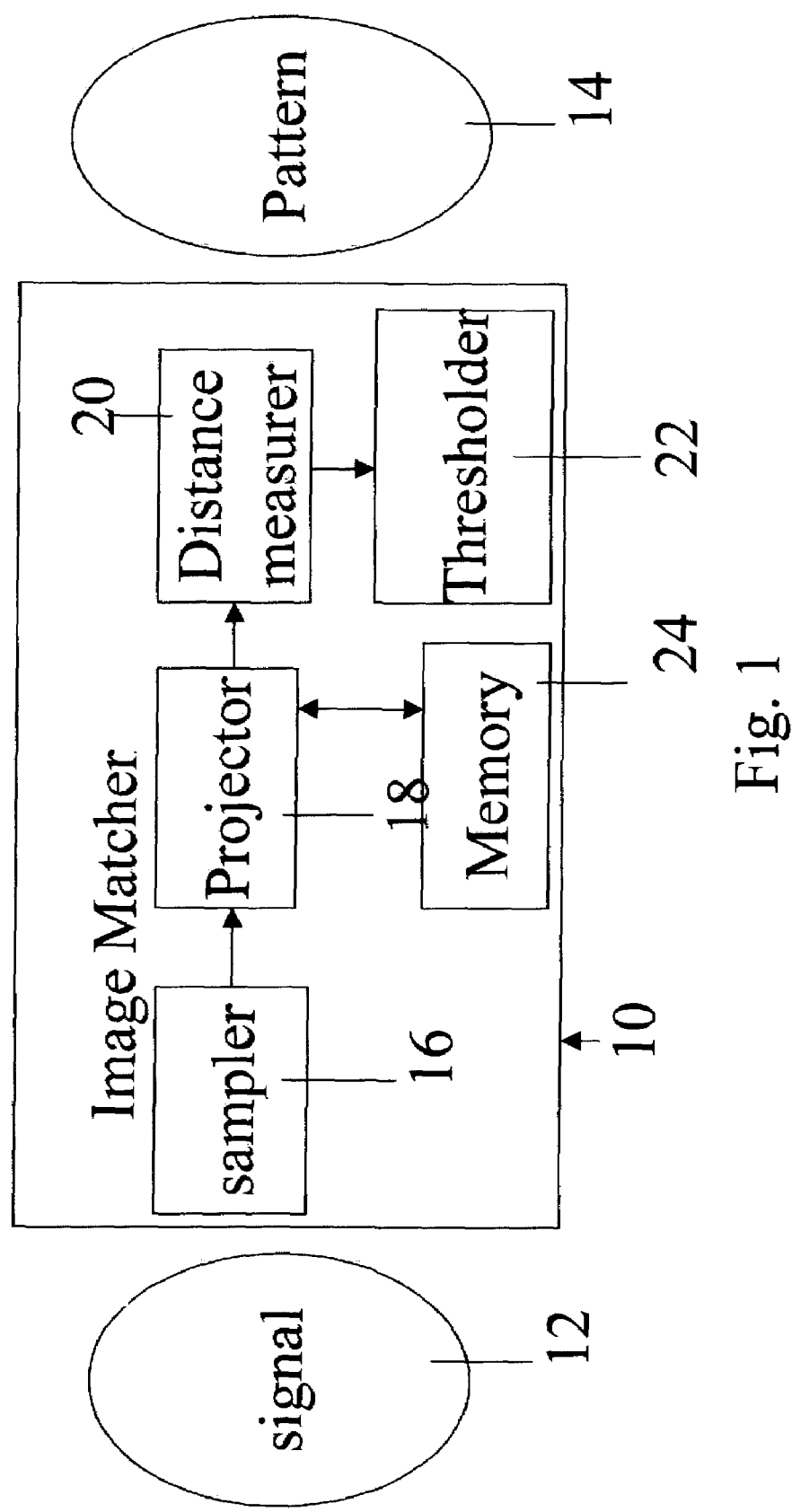
FIG. 1 is a simplified block diagram showing a first preferred embodiment of a pattern matcher operative in accordance with the present invention.

The present embodiments show a method and apparatus for providing pattern matching of one, two, three, and in principle higher, dimensional signals. The calculation intensity needed by the present embodiments is substantially lower than typical schemes in use today. The embodiments show use of a collection of vectors, hereinafter projection vectors, of successively increasing frequency. Windowed sections of the signal are projected onto the vectors progressively and a distance is calculated between the projection and a similar projection made of the pattern whose match is being attempted. Such a distance does not correspond to the actual distance between the signal section and the pattern but does provide a lower bound on the distance. Thus a threshold can be used to reject signal sections whose lower bound is too high to merit further consideration. Every additional projection tightens the lower bound. Appropriate choice and ordering of the projection vectors ensures that the vast majority of signal sections are rejected early on in the matching process.

In the preferred embodiments, a series of orthogonal vectors are used as these quickly capture the energy of the image. Then vectors of the preferred embodiment are also arranged in a tree structure since the tree structure is fast to compute. However it is stressed that the invention extends to any collection of vectors that fulfill two criteria, that of capturing image energy and of being fast to compute.

As an example the preferred embodiment uses Walsh Hadamard basis vectors, arranged in a tree structure to progress from low to high frequency.

As will be explained in greater detail below, a tree structure arranged in nodes allows for results at a parent node to be calculated just once and then used for all child nodes, thus leading to an overall minimization in calculation operations.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified block diagram showing a pattern matcher operative in accordance with a first preferred embodiment of the present invention. Pattern matcher 10 compares windowed samples of a signal 12 with a pattern 14 to find signal samples that substantially match the pattern. The pattern matcher 10 comprises a sampler 16 which windows the signal 12 for use by projector 18. Projector 18, connected at the output of sampler 16, projects the signal samples over a tree of projection vectors in a manner to be described hereinbelow. The projection vectors are preferably Walsh Hadamard basis vectors and are arranged into a tree structure so as to provide successively increasing frequency when progressing from side to side. The projector provides a projection value for a signal sample at each node of the tree. In addition the projector 18 provides a projection value for the pattern 14.

Connected to the output of the projector 18 is a distance measurer 20. The distance measurer calculates distance values, and may for example use a Euclidean distance, an $L_1$ norm or any other norm distance. In general the distance measurer is configured to calculate distances between projection values, but at certain stages of the matching procedure outlined herein may also calculate distances between actual signal vectors.

As will be explained in greater detail below, the distance between two projection values provides a lower bound, that is to say a minimum, for the distance between the actual signal vectors. Thus, the distance between the projection values can be used to reject signal samples as being obvious non-matches. A thresholder 22 may be connected to an output of the distance measurer 20, to apply a threshold to the minimum bound, and thus to reject the obvious non-matches.

As will be described in greater detail below, the tree of projection vectors comprises successively mutually orthogonal vectors, and furthermore the vectors are of successively increasing energy. Thus the lower bounds steadily get tighter and tighter and more and more windows can be rejected as non-matches. It should be noted that the order of the projection vectors (accordingly the order of the branches in the tree) may be changed to enhance performance for specific classes of input signals.

As will be explained in greater detail below, the tree of projection vectors comprises a branched arrangement of nodes extending from the root, and each intermediate node in the tree has a parent node and 2 child nodes. The projector comprises a memory 24 for storing a calculation at a parent node until all child node projections have been calculated, thus reducing the overall calculation during the process.

A set of projection vectors that can be used in the tree and which fulfils the requirements set out herein are the Walsh Hadamard basis vectors. The Walsh Hadamard basis vectors are discussed in greater detail below.

The projector 18 is configured to recursively descend or ascend the tree. Descent is along a tree branch starting from the first non-computed node and ending at the node (leaf) for which projection values are required. Ascent is from the node (leaf) for which projection is required along the branch towards the root and only up to the node for which values have already been calculated. A recursive ascent of this kind, referred to as a bottom-up approach BU, is described in greater detail below, and is accompanied by an explanation of when it can be most advantageous.

The projection vectors used in the tree may be one-dimensional projection vectors, in which case pattern matching is effective for a one dimensional signal. Likewise the projection vectors may be two-dimensional projection vectors, in which case pattern matching is effective for two-dimensional images. The projection vectors may also be three-dimensional projection vectors, in which case pattern matching is effective for volumes. By extension, if the projection vectors are four and higher dimension vectors then pattern matching is effective for four and higher dimension patterns.

As is explained below, the matching system is tolerant to noise. Real world signals tend to include a certain amount of noise. Pattern matching in the presence of noise proceeds in the same way as above. Noise tolerance is increased by raising the rejection threshold in thresholder 22. The projection process proceeds as before except that fewer signal samples are rejected at each stage and pattern recognition takes longer. Nevertheless, as the experimental data below demonstrates, there is no significant loss of accuracy.

The distance measurer 18 is configured to calculate distances in different ways for use in different parts of the pattern matching process and in different circumstances. A matching process that has already eliminated the vast majority of signal samples can always be terminated in a single step by calculated a direct distance (DD) between the remaining signal samples and the pattern. Such a single step termination is advantageous when a very small percentage of the original samples remain, typically less than 2.5%.

For the tree configuration of the preferred embodiments, the first branch of the tree, the rightmost branch in the figures below, comprises DC level information. The projector can be set to skip the first branch, for example if DC invariant pattern matching is required.

As described above, each surviving window is given a projection value. However, often in images, windows that are close to each other give similar projection values. Thus, in an embodiment, substantial calculating capacity can be saved by calculating projection values and lower bound distances for only some of the windows and then estimating or interpolating for neighboring values.

Figure 2:
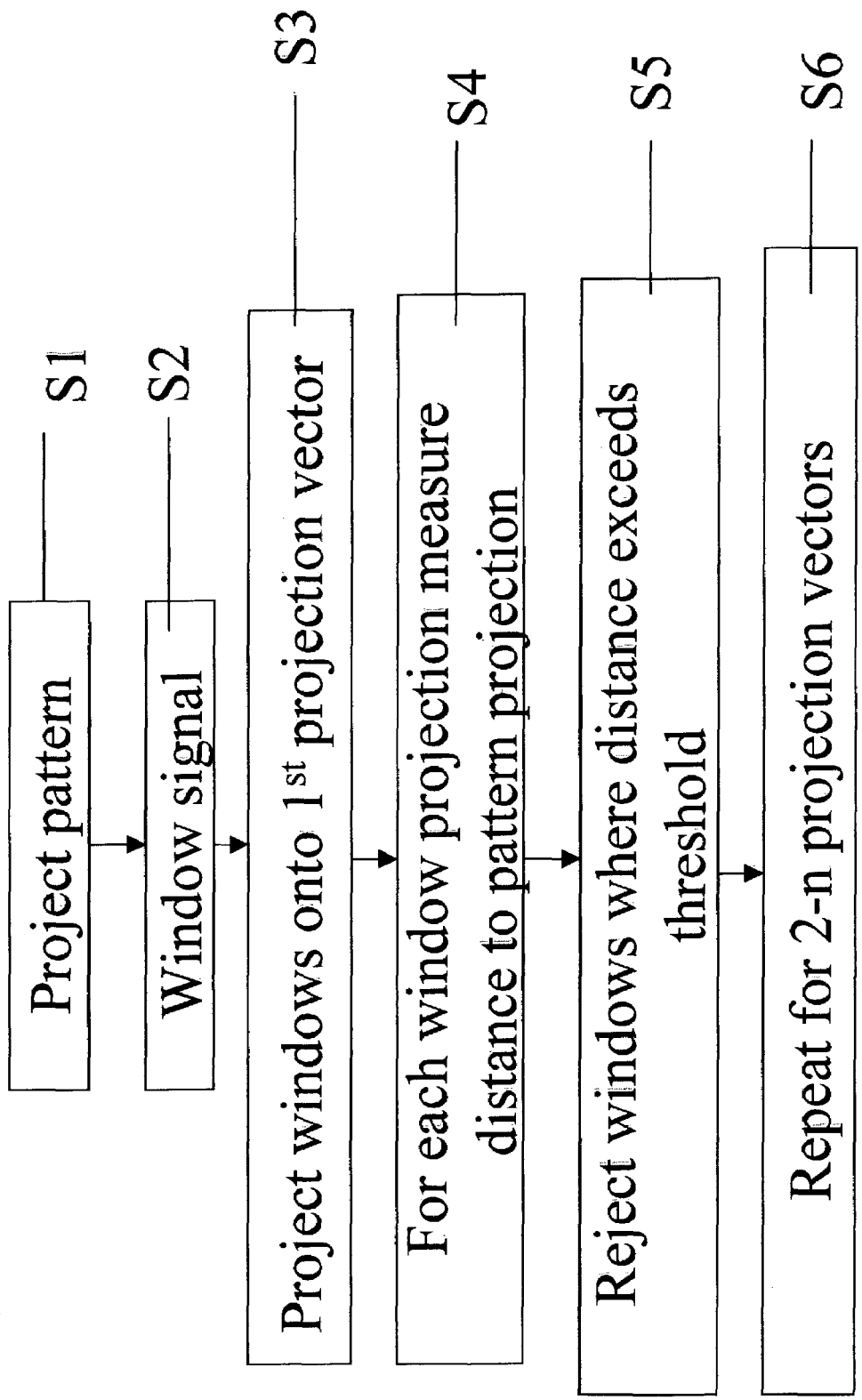
FIG. 2 is a flow chart showing operation of the embodiment of FIG. 1.

Reference is now made to FIG. 2, which is a simplified flow chart illustrating a procedure for matching a pattern to samples of a signal according to a preferred embodiment of the present invention. In a step S1, the projection values of the pattern that it is desired to find matches for is computed (either by using the projection tree or using any other fast Walsh transform method). In a subsequent step S2 an incoming signal is sampled or windowed. In a step S3 the samples are projected onto a first projection vector to produce a projection value for each sample. In step S4 a distance is calculated between each sample projection value and the pattern projection value for that projection vector. As explained above, the distance between the projection values sets a lower bound for the distance between the samples and the pattern so that any sample whose distance exceeds a threshold can be confidently rejected in a thresholding and rejection stage S5.

In step S6, the procedure at the first projection vector is then repeated for second and subsequent projection vectors. The projection vectors are selected so as to give successively tighter lower bounds. Thus, after sufficient projection vectors the procedure converges on a small number of matches. As explained above, once a certain percentage of windows have been rejected, say 98%, either Bottom-Up (BU) or direct distance (DD) measuring can be carried out.

Figure 3:
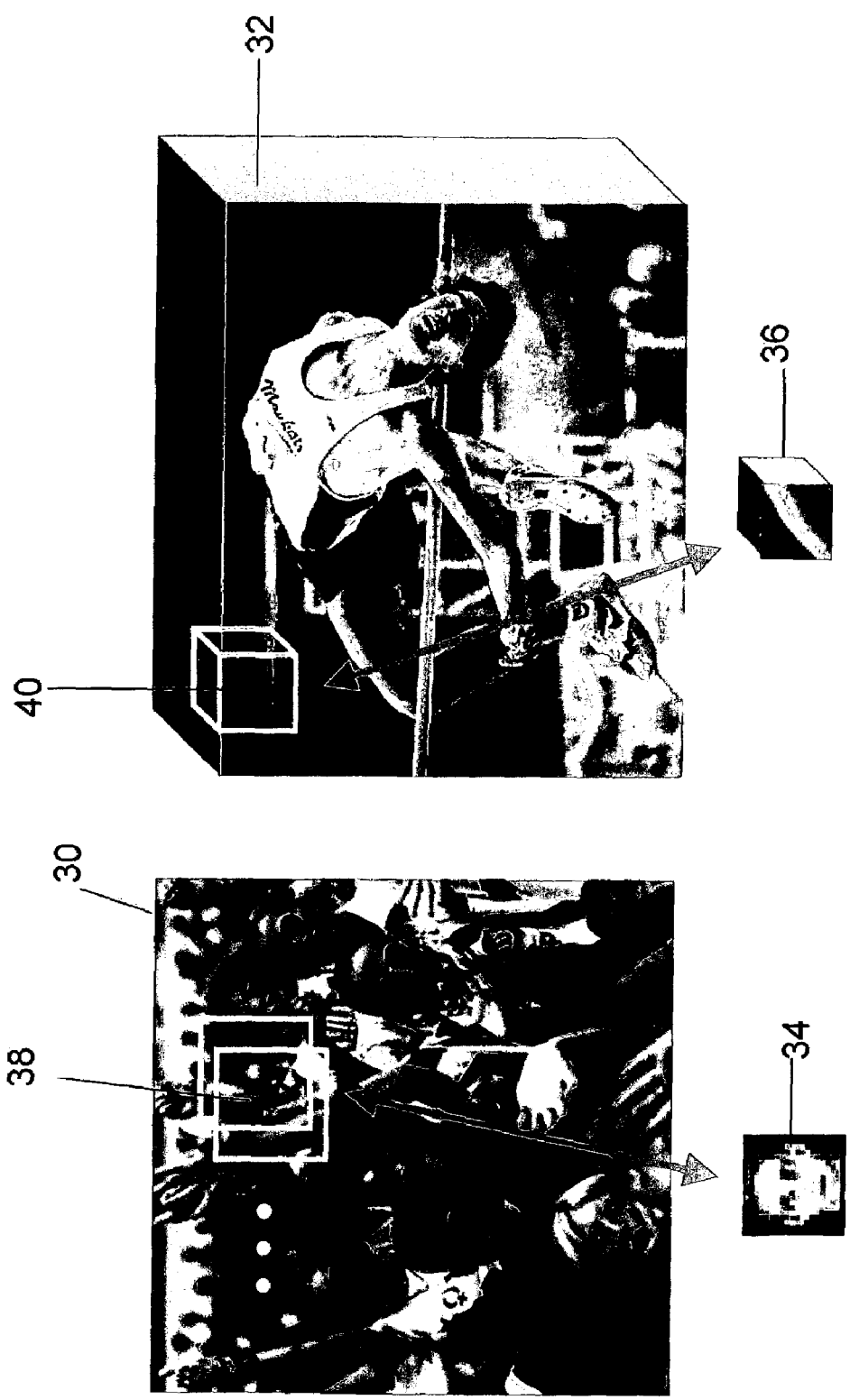
FIG. 3 shows two sample images, respectively 2D and 3D, with 2D and 3D patterns to match to them.

Reference is now made to FIG. 3, which is a simplified diagram showing two images, one in 2D and one in 3D, 30, and 32, respectively, and showing two patterns, 34 and 36, that it is desired to match. As shown in FIG. 3, a given pixel location is selected in the image and the region around the selected location is compared with the pattern. Thus in image 30, region 38 is compared with pattern 34. In image 32, region 40 is compared with pattern 36.

A quantitative discussion of the preferred embodiments now follows:

It is assumed that a k×k pattern p is to be matched against a similar sized window w at a particular location in a given image. Referring to the pattern p and the window w as vectors in $\Re^{k^2}$, the Euclidean distance can be re-written in vectorial form:

$$d_2^E(p, w) = \|p-w\|^2 \quad (3.2)$$

Now, assume that p and w are not given, but only the values of their projection onto a particular unit vector u: $u^T p$ and $u^T w$, where $\|u\|=1$. Since the Euclidean distance is a norm, it follows from the Cauchy-Schwartz inequality, that a lower bound on the actual Euclidean distance can be inferred from the projection values (See Appendix A):

$$d_E(p, w) \geq d_E(u^T p, u^T w) \quad (3.3)$$

Figure 4:
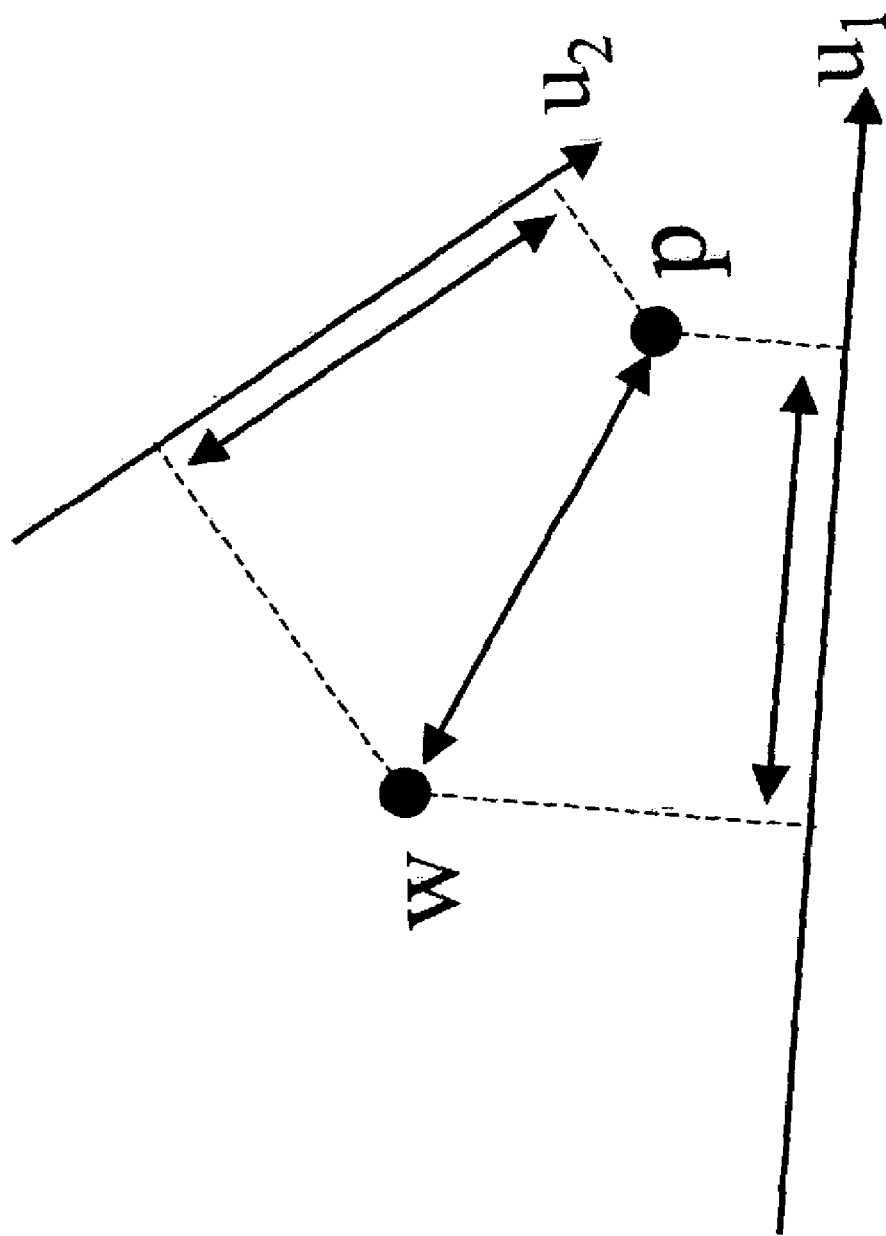
FIG. 4 is a simplified vector diagram showing projection of a vector w-p onto two projection vectors u and v.

If an additional projection vector v is given along with its projection values: $v^T p$ and $v^T w$, it is possible to tighten the lower bound on the distance. Reference is now made to FIG. 4, which shows the projection of p−w onto projection vectors u and v. It is apparent that projection in fact produces lower bounds on the actual distance $\|p-w\|$. The calculations follow the Grahm-Schmidt process for orthogonalization.

For the new projection vector v, its component along the direction orthogonal to to the previous projection vector u is calculated. Accordingly, the projection values of p and w along the orthogonal direction are inferred. Defining the previous bound:

$$\beta = d_E(u^T p, u^T w)$$

and the distance between the projection values onto the new vector v:

$$\alpha = d_E(v^T p, v^T w)$$

the updated bound is (see Appendix B):

$$d_E^2(p, w) \geq \beta^2 + \frac{1}{\|v - uu^T v\|^2}(\alpha - \beta v^T u)^2$$

Note, that when v and u are parallel, the bound does not change. On the other hand, when u and v are orthogonal, the new bound is higher and thus tighter:

$$d_E^2(p, w) \geq \beta^2 + \frac{\alpha^2}{\|v\|^2}$$

This scheme can be generalized for any number of projection vectors that are given sequentially;

Define the distance vector d=w−p, and assume that the projection values of d onto k orthonormal projection vectors are given:

$$U^T d = b$$

where $U = [u_1 \ u_2 \ \ldots \ u_k]$ is a matrix composed of the k orthonormal projection vectors, and b are the projection values. It is straightforward to verify that the lower-bound on the distance is:

$$d_E^2(p,w) = d^T d \geq b^T b$$

Now, if a new projection vector v is given where $v^T d = \alpha$, the new lower-bound will be (See Appendix B for proof):

$$d^T d \geq b^T b + \frac{1}{\gamma^2}(\alpha - v^T Ub)^2$$

where $\gamma = \|v - UU^T v\|$

Note, that as the number of projection vectors increases, the lower bound on the distance $d_E(p, w)$ becomes tighter. In the extreme case where $r = k^2$ and the projection vectors are linearly independent, the lower bound reaches the actual Euclidean distance. In addition, it can be seen from the algorithm that if the projection vectors $u_i$ are mutually orthonormal, the lower bound is a direct sum of the projected difference:

$$LB = \sum_i (u_i^T p - u_i^T w)^2$$

Finding Efficient Projection Vectors

According to the discussion in the previous section, it is clear that any set of linearly independent projection vectors provides a lower-bound on the Euclidean distance between a pattern p and an image window w. At first thought, however, it is unclear why the pattern p and all image windows w should be projected in order to calculate the distance $\|d\| = \|p - w\|$ when the exact Euclidean distance can be computed directly for each window $d^T d$. The answer lies in the appropriate selection of the projection vectors. A large saving in calculations can be gained if the projection vectors are chosen carefully according to the following two necessary requirements:

1. The projection vectors should have a high probability of being parallel to the vector d=p−w.
2. Projections of image windows onto the projection vectors should be fast to compute.

The first requirement implies that, on average, the first few projection vectors should capture a large proportion of the distance between the pattern and the image window. If this requirement is met, a tight lower bound is quickly obtained, and this, in turn, allows rapid rejection of image windows that are distant from the pattern. The second requirement arises from the fact that in the pattern matching scenario discussed here, the projection calculations are performed many times (for each window of the image). As such, the efficiency of the projection calculations plays an important role when choosing appropriate projection vectors.

The idea of choosing projection vectors that are fast to apply is not new [25, 12, 7]. In [25] Viola uses a set of projection vectors to produce a feature set, which serves as input to a face detection classifier. In Viola's framework, a set of vectors are chosen such that they can be applied very rapidly using an integral image scheme [5]. This process also includes a rejection phase where non-relevant windows can be classified as such very efficiently. Viola's scheme deals with classification problems, and, in particular, the projection vectors are restricted to those applicable in the integral image scheme. In some classification problems, however, such vectors can produce poor results as they may form non-informative feature inputs. In the embodiments of the present invention such behavior is avoided since the projection vectors are selected to form a complete representation of the input.

There is a choice of possible vector sets that satisfy the above two requirements. The embodiments described implement the ideas using the Walsh-Hadamard basis set, although it will be appreciated that this is purely exemplary. The Walsh-Hadamard basis vector set is selected herein as a good candidate in the preferred embodiments for the projection vectors. It will be shown below that these vectors capture a large portion of the image energy with very few projections. Additionally, a scheme is suggested to calculate the projection values very efficiently, over all k×k windows in an image. It is pointed out however that Walsh Hadamard is not the only set of vectors that fulfill the above requirements.

The Walsh-Hadamard Basis Vector

The Walsh-Hadamard transform has long been used for image representation under numerous applications. The elements of the basis vectors take only binary values (±1). Thus, computation of the transform requires only integer additions and subtractions. The Walsh-Hadamard transform of an image window of size k×k ($k = 2^m$) is obtained by projecting the image onto $k^2$ basis vectors (projection vectors) [26, 20, 14, 23]. In our case, it is required to project each k×k window of the image onto the basis vectors. This results in a highly over-complete image representation, with $k^2 n^2$ projection values for the entire image.

Figure 5:
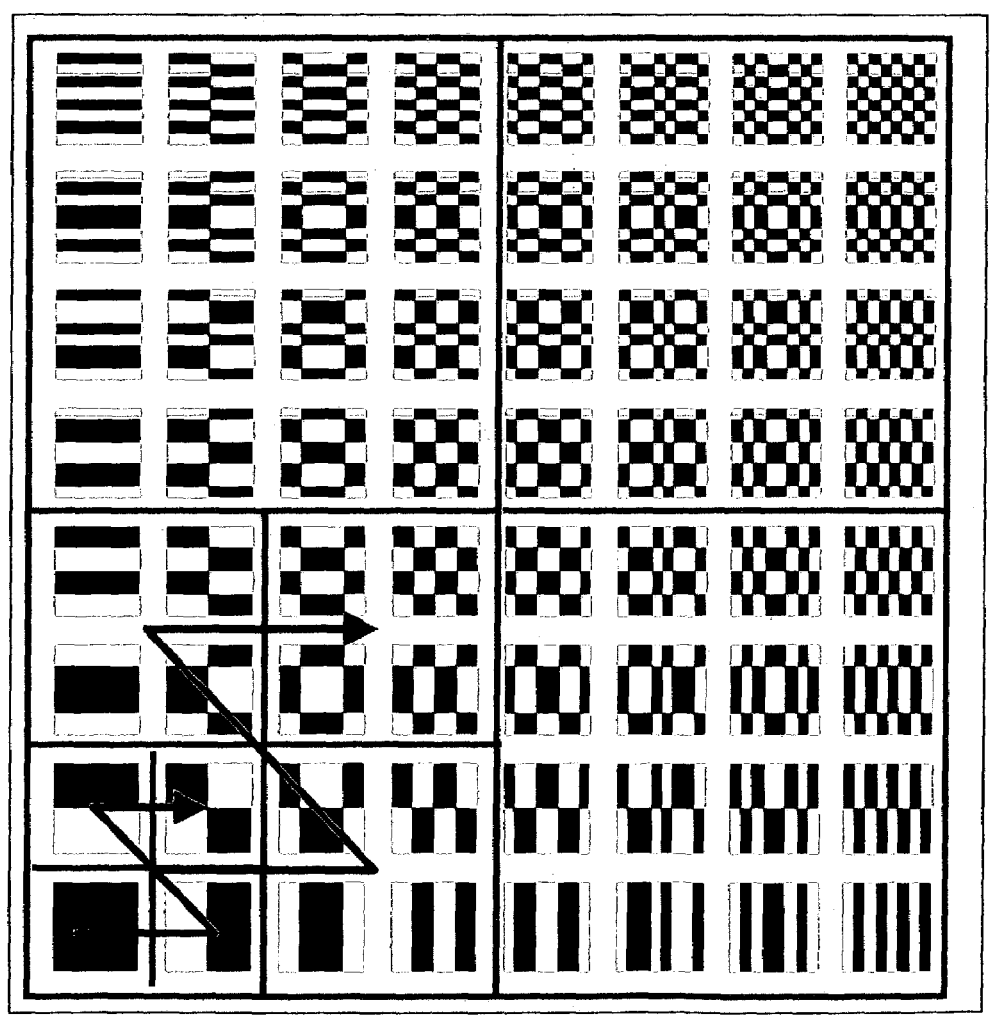
FIG. 5 is a diagram showing a series of Walsh Hadamard 2D basis vectors that can be used as projection vectors for 2D embodiments of the present invention.

Reference is now made to FIG. 5, which shows the basis vectors associated with the 2D Walsh-Hadamard transform of order $n=2^3=8$. Each basis vector is of size 8×8 where black represents the value +1, and white represents the value −1. The projection vectors are ordered with increasing spatial frequency. It is noted that the notion of frequency when discussing Walsh-Hadamard transforms is often denoted sequency and refers to the number of sign changes along rows and columns of the basis vector. A diadic ordering of these vectors is shown by the overlaying arrows. The diadic ordering is induced by the algorithm discussed below and although not exactly according to sequency, captures the increase in spatial frequency. The ordering of the basis vectors plays a significant role with respect to the first requirement mentioned above, namely, that a high proportion of the window energy is captured by the first few basis vectors [13]. In terms of pattern matching, the lower bounds on distances between window and pattern, are shown to be tight after very few projections.

Figure 6B:
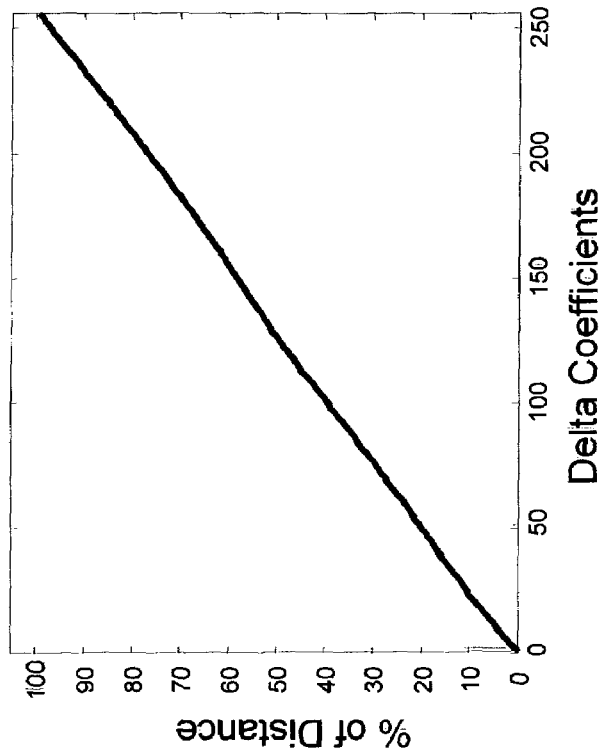
FIG. 6A shows projection onto Walsh Hadamard vectors and FIG. 6B shows projection onto standard basis vectors.
Figure 6A:
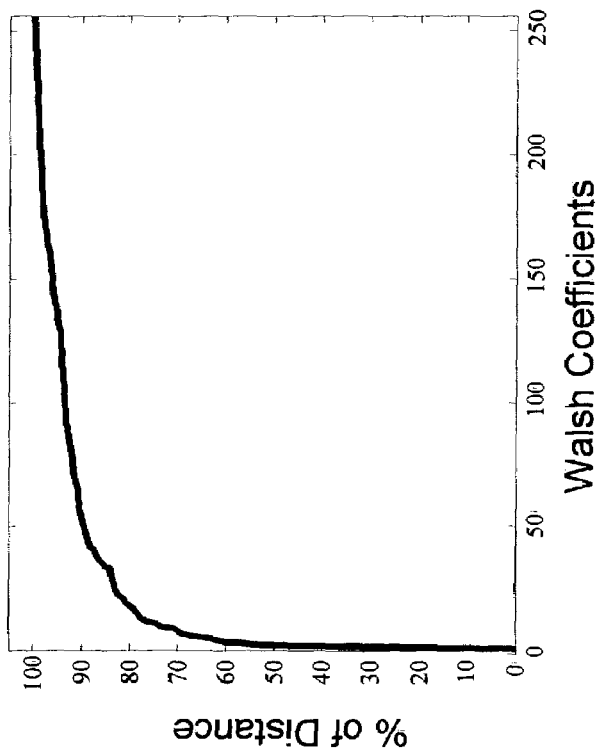

Reference is now made to FIGS. 6a and 6b which are two graphs showing % of distance against No. of Walsh and Delta coefficients respectively. The lower bound on the distance between image window and pattern is shown as a percentage of the total distance, versus the number of projection kernels used. The values displayed are averaged over 100 16×16 pattern-window pairs chosen randomly from natural images. It can be seen that the first 10 (out of 256) Walsh-Hadamard kernels capture over 70% of the distance. For comparison, FIG. 6b shows the same lower bound when using the standard basis for projection (delta functions), i.e. when calculating the Euclidean distance in the spatial domain by accumulating pixel difference values.

As discussed above, a critical requirement of the projection vectors, is the speed and efficiency of computation. An efficient method for calculating the projections of all image windows onto a sequence of Walsh-Hadamard projection vectors is introduced. The efficiency of computation is due to three main factors:

1. The present embodiments take advantage of the fact that calculations applied to one window can be exploited in the computation of the neighboring windows. This idea has been exploited in other windowing schemes such as the integral image [25], median filtering [9], and convolution using FFT [16]

2. The present embodiments take advantage of the recursive structure of the Walsh-Hadamard basis vectors, where projections can be applied in a cascading manner. Thus, calculations applied to one basis vector, can be exploited in the computation of the subsequent basis vectors.

3. Finally, we exploit the characteristic of the Walsh-Hadamard projection vectors discussed above, in which the first few vectors capture a large proportion of the distance energy between the pattern and a window. Thus, in practice, after a few projections, the lower-bound on the distance is tight and enables most image windows to be rejected from further consideration.

The Walsh-Hadamard Transform for Pattern Matching

The Walsh-Hadamard Tree Structure

Reference is now made to FIG. 7, which is a simplified diagram showing a tree structure 50, having a root node 52 and a series of branches. Each of the 1D Walsh Hadamard projection vectors 54 is associated (and shown below) a leaf node of the tree. The tree-scheme computes projections of all windows of a 1D image vector onto all Walsh-Hadamard kernels of order 8.

FIG. 7 shows the 1D pattern matching case. Given a 1 dimensional signal vector of length n, and a pattern vector of length k. the goal is to find appearances of the pattern in the signal. To this end, the preferred embodiments project each window of the signal, of length k, onto a set of 1D Walsh-Hadamard basis vectors represented at the leaf nodes at the base of the tree.

The 1D Walsh-Hadamard Transform of order k, projects a single window of the signal onto k basis vectors. In our case, however, we need the projection values for each window of the signal. These projections can be computed efficiently using the tree scheme depicted in FIG. 7. There are $\log_2(k)+1$ levels in the tree. Every node in the tree represents a vector of intermediate values used in the computation. The root node represents the original signal vector. The i-th leaf represents a vector containing the projection values of all signal windows onto the i-th Walsh-Hadamard basis vector.

In FIG. 7, the symbols + and − represent the operations performed at the given tree level. A symbol + (−) on an edge connecting nodes at level i and level i+1 denotes the computation performed on the signal at level i, in which to every entry j of the signal, the value of entry j+Δ is added (subtracted), where $\Delta=2^i$. Thus, the 2 signals at level 1 are obtained by adding or subtracting consecutive entries in the signal of level 0 which is the original signal. The 4 signals at level 2 are obtained by adding/subtracting entries at distance 2 in the signals at level 1, and so on.

Figure 8:
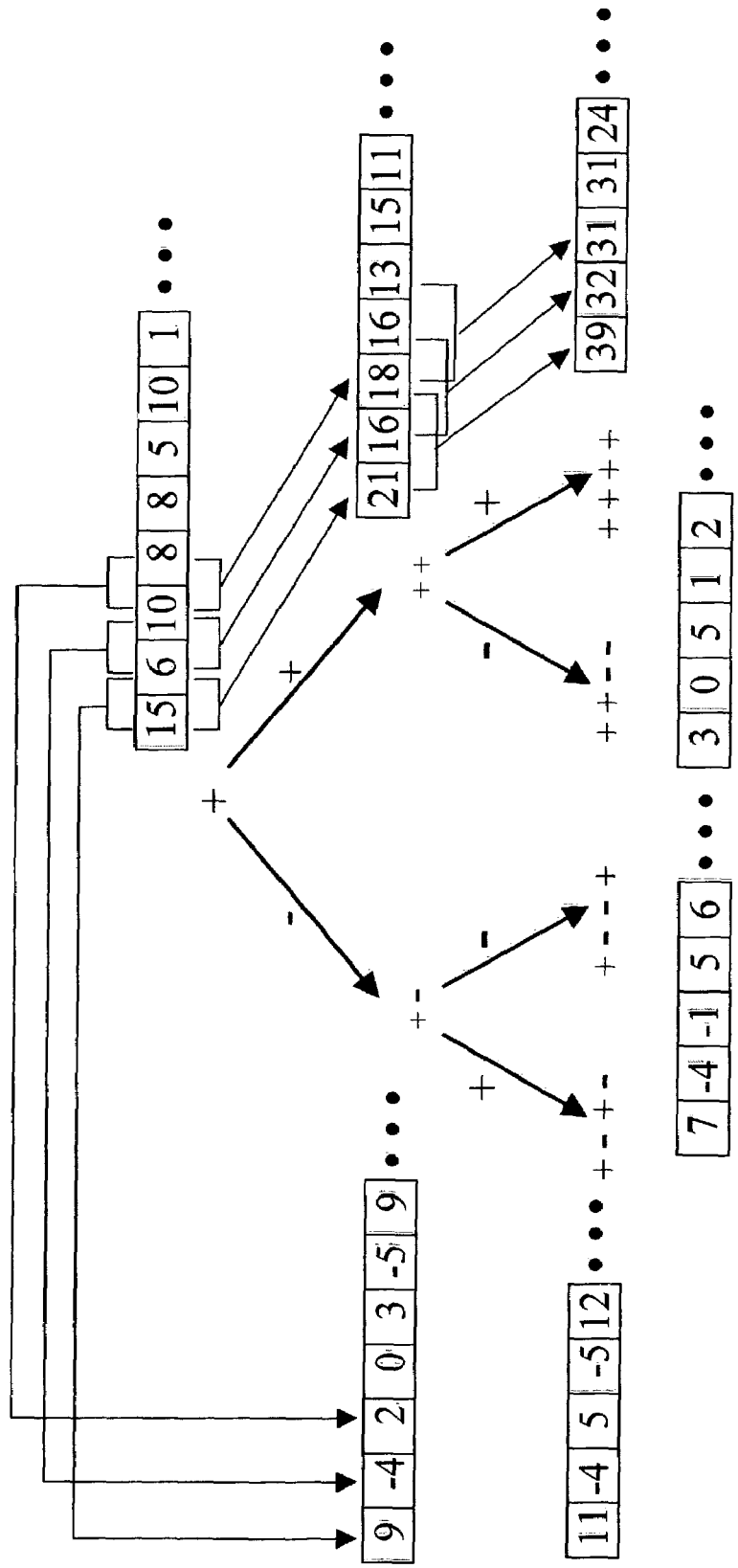
FIG. 8 is a simplified tree diagram showing the use of the tree of FIG. 7 for computing projections of a signal sample or window.

Reference is now made to FIG. 8, which shows the above described process being carried out for a vector describing a 1D signal applied to the Walsh-Hadamard tree when the pattern and window size are 4. The projection is made onto all Walsh Hadamard kernels of order 4.

The Walsh-Hadamard tree is used to compute projections of signal windows onto Walsh-Hadamard basis vectors. Computations within the tree are typically performed by descending from a node in the tree to its child. This requires a single operation per pixel: addition or subtraction of two values in the parent node. The following lists various projections that may be computed using the tree. The number of operations are given as well.

[2] Projecting all windows onto a single projection vector. This corresponds to evaluating all signal values at a single leaf of the tree. This is performed by descending the tree, top-down, from the root down to the appropriate leaf. At each level, all entries at that node are calculated. Note, that due to the tree structure, every intermediate computation actually serves many windows. Thus, computation is efficient and a total of only $\log_2(k)$ operations per signal entry are required.

[2] Projecting all windows onto a set of consecutive projection vectors. This corresponds to evaluating all entries in a consecutive set of leaf nodes of the tree. This extends the previously described type of projection. Thus projection can be calculated as described above for each projection vector. However in the top-down descent of the tree, many nodes are common to several branches. For example, the first 2 projection vectors, have $\log_2(k)$ nodes in common to both paths. Thus, given the branch of signals associated with the computation of the first projection vector, only one additional operation per entry is required for the second projection vector. In general, when computing the signal values at the leaf nodes of the tree in right to left order, the Walsh-Hadamard tree is traversed in pre-order. The projection of all windows onto the first 1 projection vectors requires m operations per pixel, where m is the number of nodes preceding the 1 leaf in the pre-order tree traversal. Thus, projecting all windows onto all projection vectors requires only 2k−2 operations per pixel, which gives about 2 operations per pixel per projection vector.

Projecting a single window onto a single projection vector. This corresponds to evaluating a single entry in one of the leaves of the tree. To compute this value, a single branch of the tree must be traversed—the branch from the root to the leaf associated with the projection vector. However since not all values of all the nodes in the branch are required for computation, the projection is calculated more efficiently by recursively ascending the tree bottom-up, from the leaf to the root node, and determining only those entries that are required for the computation and that have not been previously computed. To compute an entry at level i, only two entries are needed at level i−1. Therefore, a total of at most k−1 operations (additions/subtractions) are required for this projection.

Using The Walsh-Hadamard Tree Structure for Pattern Matching

The pattern matching approach of the present embodiments uses the Walsh-Hadamard tree structure and follows the projection schemes described above. In general, all signal windows must be projected onto all Walsh-Hadamard basis vectors. However, as described with reference to FIG. 4 above, a lower bound on the distance between each window and the pattern can be estimated from the projections. Thus, complexity and run time of the pattern matching process can be significantly reduced by rejecting windows with lower bounds exceeding a given threshold value. The rejection of windows implies that many signal values at the tree leaves need not be computed.

In the pattern matching process, the projections are performed on basis vectors in the order determined by traversing the leaves in right to left order. At each step in the process, only a single branch of the Walsh-hadamard tree is maintained. The single branch includes all the nodes from the root down to the current leaf. Only the signals associated with these nodes must be stored, and the memory required for this process is $n(\log_2(k)+1)$.

Figure 9B:
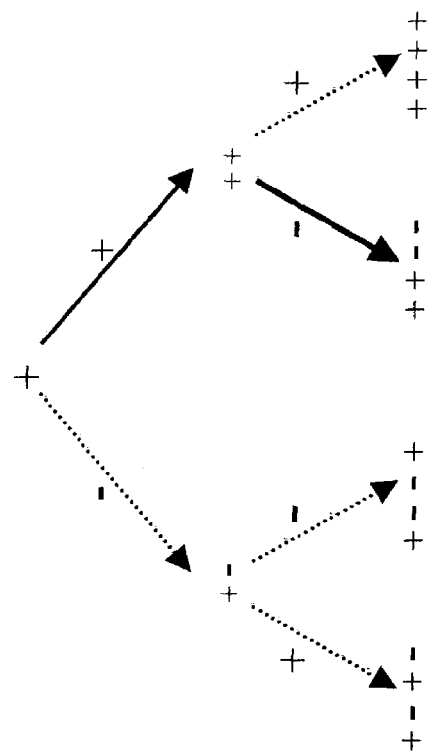
FIG. 9 is a simplified tree diagram showing successive computations along branches of the tree of FIG. 7 and illustrating how calculations can be saved by retaining results at a parent node for each of respective child nodes.
Figure 9A:
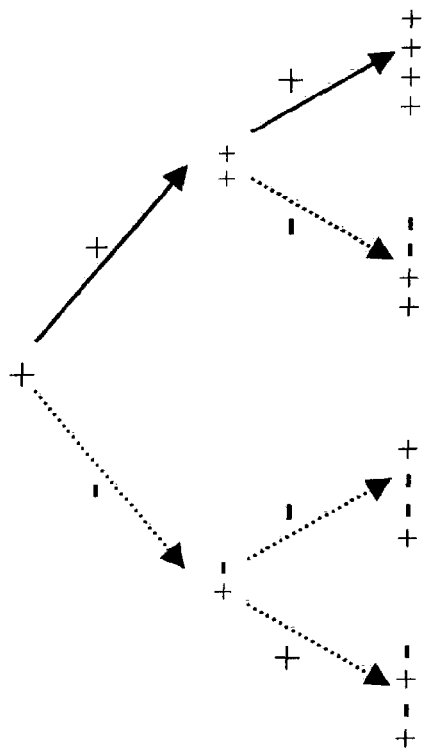

Reference is now made to FIG. 9, which is a simplified branch diagram showing how advantage can be taken of the tree structure to avoid repeating calculations. Each of FIGS. 9a and 9b show successive stages of the tree based calculations. The tree branches are shown in dotted lines, but those branches for which calculations are being made are shown in full. FIG. 9a shows an initial step, which computes the first branch of the image, associated with the first Walsh-Hadamard kernel in solid lines. FIG. 9b shows computing of the branch associated with the second kernel. It will be clear that it is possible to exploit the fact that several of the branch nodes have already been computed in the initial step.

Assume the sought pattern p is projected onto the set of k Walsh-Hadamard basis vectors $\{u_i\}$, resulting in k values: $\hat{p}_i = p^T u_i$, for $i=1 \ldots k$. The pattern matching process then proceeds as follows:

1. The first branch of the tree is computed, obtaining the projections of all signal windows $\{w_i\}$ onto the first Walsh-Hadamard projection vector $u_1$:

$$\hat{w}_i^1 = w_i^T u_1 \quad \text{(FIG. 9a)}.$$

2. This first projection sets a lower bound on the true distance between each window $w_i$ and the pattern: $LB_i = (\hat{w}_i^1 - \hat{p}_1)^2$. According to the lower bound values, any window whose LB value is greater than the given threshold can be rejected.

3. The windows of the image that have not been rejected are projected onto the second projection vector $u_2$: $\hat{w}_i^2 = w_i^T u_2$. The second projection is performed by replacing the maintained tree-branch associated with the first leaf node with the branch associated with the second leaf node (FIG. 9b). This produces updated lower bounds: $LB_i = LB_i + (\hat{w}_i^2 - \hat{p}_2)^2$.

4. Steps 2 and 3 are repeated for the third and subsequent projection vectors but only for those image windows that have not been rejected.

5. The process terminates after all k kernels have been processed or alternatively may be terminated when the number of non-rejected image windows reaches a predefined value.

During the matching process it is possible to compute the projection values in two ways, an approach referred to as top down, and an approach referred to as bottom up. The top—down approach calculates the projections of all the signal windows. Top down is preferable in the initial stages (typically only the first stage), when the number of rejected windows is small. However, in advanced stages, when the number of rejected windows is sufficiently large, it is preferable to compute the projection on a pixel by pixel basis, i.e. in a bottom-up manner as discussed with respect to FIGS. 7 and 8 above. In practice, when only a very few image windows remain, it is preferable to calculate the Euclidean distance directly for these windows (using the standard basis).

The complexity of the pattern matching process may be calculated as follows: Initially (Step 1), $\log_2(k)$ operations per pixel are required to calculate the projection of all windows onto the first projection vector. In the following stages of the process (repeated Steps 2–3), every projection requires only $2^l-1$ operations per pixel where l is the number of nodes that differ between the current branch and the previous branch of the tree. However, these $2^l-1$ operations are required only for those signal values requires only $2^l-1$ operations per pixel where l is the number of nodes that differ between the current branch and the previous branch of the tree.

However, these $2^l-1$ operations are required only for those signal values associated with the non-rejected windows. Thus, to increase efficiently, the order of projection kernels is significant. The order of projection, and therefore of the projection kernels, is preferably that which produces tight lower bounds on the distances between pattern and windows, using as few projections as possible. The order chosen is that of diadically increasing frequency of the kernels as discussed above in reference to FIG. 5. It will be shown in the section below on experimental results that this ordering indeed captures most of the image energy, i.e. produces tight lower bounds on the distances with very few projections. Thus the number of operations per pixel beyond the first step becomes negligible.

The number of computations actually performed during the pattern matching process is evaluated and discussed with respect to FIG. 14 below.

Experimental Results

Reference is now made to FIG. 11, which shows inputs used in experimental testing of an embodiment of the pattern matching apparatus and method as described above. FIG. 11a shows a 256×256 image, and FIG. 11b shows a 16×16 pattern which it is desired to search for in the image. FIG. 11c shows the pattern of FIG. 11b at larger scale.

Reference is now made to FIGS. 12a–c which is a series of images showing the results of application of the pattern matching scheme to the image and pattern of FIG. 11. Using the above-described embodiments, the projection of all 65536 windows of the image onto the first Walsh-Hadamard kernel were firstly calculated. All windows with projection values above a given threshold were rejected. In the experiment, the threshold value used allowed a difference of up to an average of 0.7 gray levels between pattern and window. After the first projection, only 602 candidate windows remained (FIG. 12a), i.e. only 0.92% of the original windows. Following the second projection only 8 candidate windows remained (FIG. 12b) and following the third projection a single window with the correct pattern remained (FIG. 12c). associated with the non-rejected windows. The number of computations performed during the process is evaluated and discussed with respect to FIG. 14 below.

The Walsh-Hadamard Transform for Pattern Matching in 2D

Figure 10:
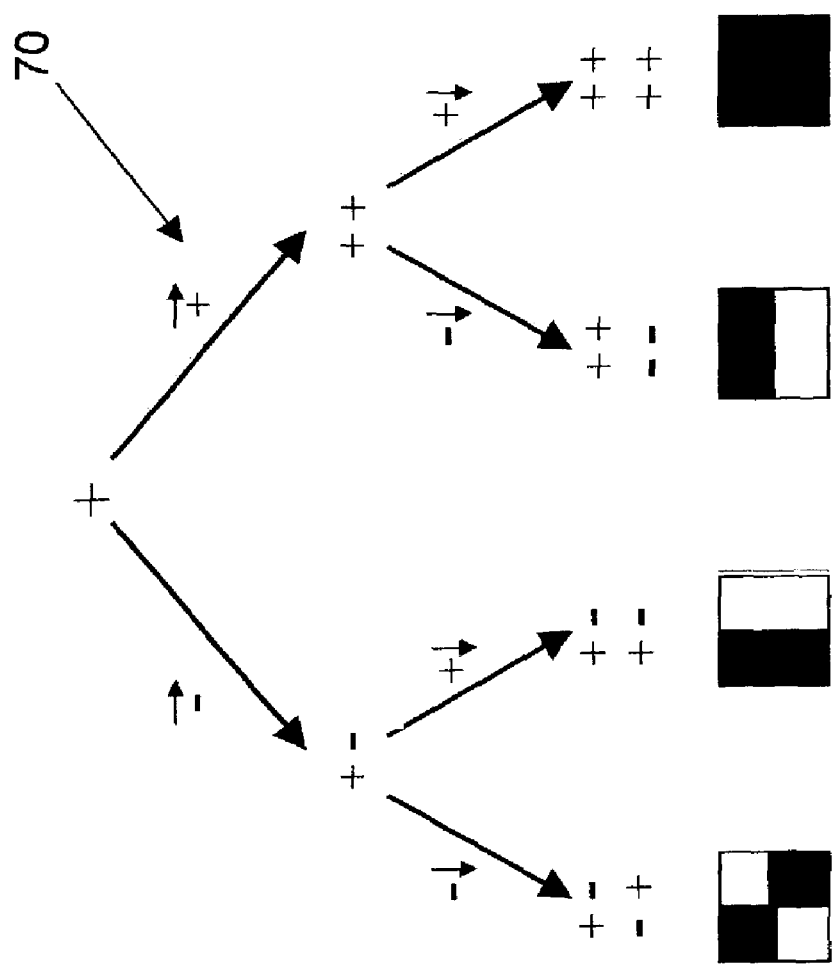
FIG. 10 is a simplified tree diagram showing use of 2D Walsh Hadamard projection vectors.

Reference is now made to FIG. 10, which is a simplified tree diagram showing the tree of FIG. 7 extended for the 2D case. Tree 70 of FIG. 10 differs from tree 50 of FIG. 5 in that the projection vectors or projection kernels at the leaf nodes are two dimensional instead of one-dimensional. The pattern matching process described above for the 1D signal, can be extended to 2D images by the use of two dimensional projection vectors as illustrated. Assume that all appearances of a pattern of size k×k are sought in a 2D image of size n×n. To this end, each k×k window of the image is projected onto a set of 2D Walsh-Hadamard kernels.

A Walsh-Hadamard tree similar to that described above is used here. However, for the 2D case, the tree depth is $2\log_2(k)$ rather than $\log_2(k)$, and there are $k^2$ leaf nodes. FIG. 10 depicts such a tree for the Walsh-Hadamard transform of order 2×2. Each node represents an n×n image of intermediate values used in the computation. The root node represents the original n×n image.

The i-th leaf node represents an n×n image containing the projection values of all image windows onto the i-th Walsh-Hadamard kernel. The operations performed at a given tree level are represented by the symbols →+, →−, +↓ and −↓.

As in the 1D case, the operations performed are additions and subtractions of pixels at a distance A from each other, however in the 2D case a distinction is made between operations performed on the rows of the image and on the columns of the image. This is designated by the arrows appearing in the symbols. Thus, the symbol, +↓ on an edge connecting node at level i and level i+1 denotes the computation performed on the image at level i in which the value of pixel (x; y+Δ) is added to every pixel (x; y) of the image, where $\Delta=2^{\lfloor i/2 \rfloor}$.

Descending from a node in the tree to its child image requires a single operation per pixel. There are $2\log_2(k)+1$ levels in the tree, thus, for every leaf (kernel), $2\log_2(k)$ operations (additions/subtraction) per pixel are required. As in the 1D case, some nodes are common to many kernel projection computations, and thus, significant computation reduction is achieved. The pattern matching process in 2D follows the same steps as described above for the 1D case.

In the 2D case, $2\log_2(k)+1$ images of size n×n are maintained at all times, corresponding to a single branch of the 2D Walsh-Hadamard tree. At each step of the process, image windows are projected onto a new projection kernel by updating the maintained branch to represent the branch associated with the new kernel. As in the 1D case, the projections of all image windows onto the i-th kernel can be computed from the branch of images associated with the computation of the (i−1)-th kernel. The number of additional operations required per pixel is dependent on the number of tree nodes that differ between the branch associated with the i-th kernel and the branch associated with the (i−1)-th kernel. (The number of differentiating nodes is easily computed since it equals the most significant bit that differs between the binary representation of the indices of the two kernels). Thus in 2D, although projecting all image windows onto a single kernel requires $2\log_2(k)$ operations per pixel, projecting all image windows onto all kernels requires only $2(k^2-1)$ operations per pixel. However, during the 2D pattern matching process, not even all these $2(k^2-1)$ operations per pixel are required, since many windows are rejected during the process. As in the 1D scheme, the projection values define a lower bound on the true distance between pattern and window. Throughout the pattern matching process, windows with a lower bound exceeding a given threshold are rejected.

The Walsh-Hadamard tree that produces projections in order of diadically increasing frequency (as shown in FIG. 10) is defined by the operations (+ or −) assigned to each edge. The rule defining these operations is as follows: Let S=(+−+−−+) be a seed sequence, and P={S}* an arbitrary number of repetitions of S. At each level of the tree, scanning the operations applied at each node from right to left, yields a sequence equal to an initial string of P. From this rule it is straightforward to calculate the operation that is to be applied at any given tree level for any given branch.

Figure 13:
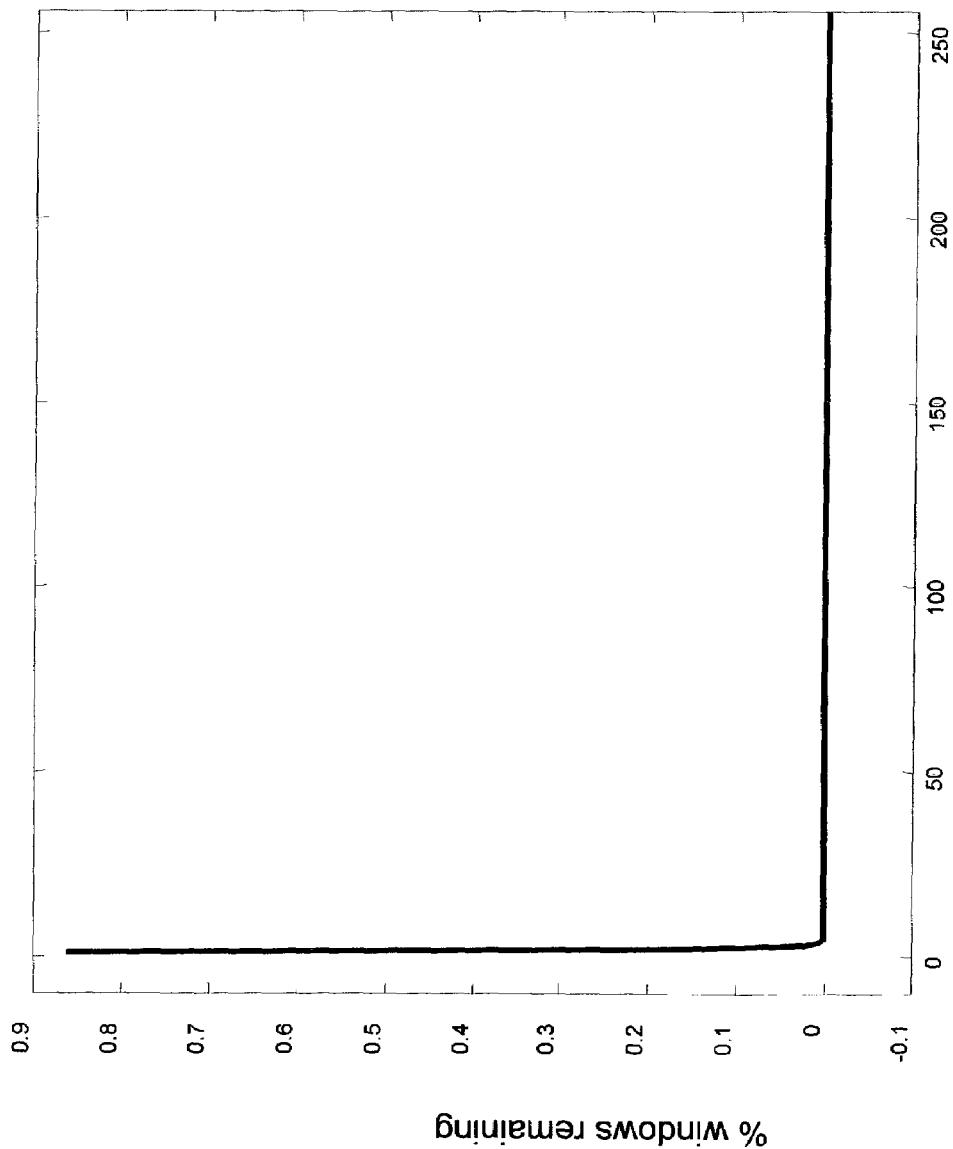
FIG. 13 is a graph showing the number of remaining signal samples or windows against projection number.

In terms of complexity, the process initially requires (Step 1) $2\log_2(k)$ operations per pixel to calculate the projection of all windows onto the first projection vector. In the following stages of the process (repeated Steps 2–3), every projection Reference is now made to FIG. 13, which is a graph showing typical performance of the method in terms of windows remaining against number of projections. The performance shown in this example is typical and has held true over many experimental examples. FIG. 13 shows the percentage of image windows remaining after each projection for images of size 256×256 and patterns of size 16×16. The results are the average over 100 image-pattern pairs.

Figure 14:
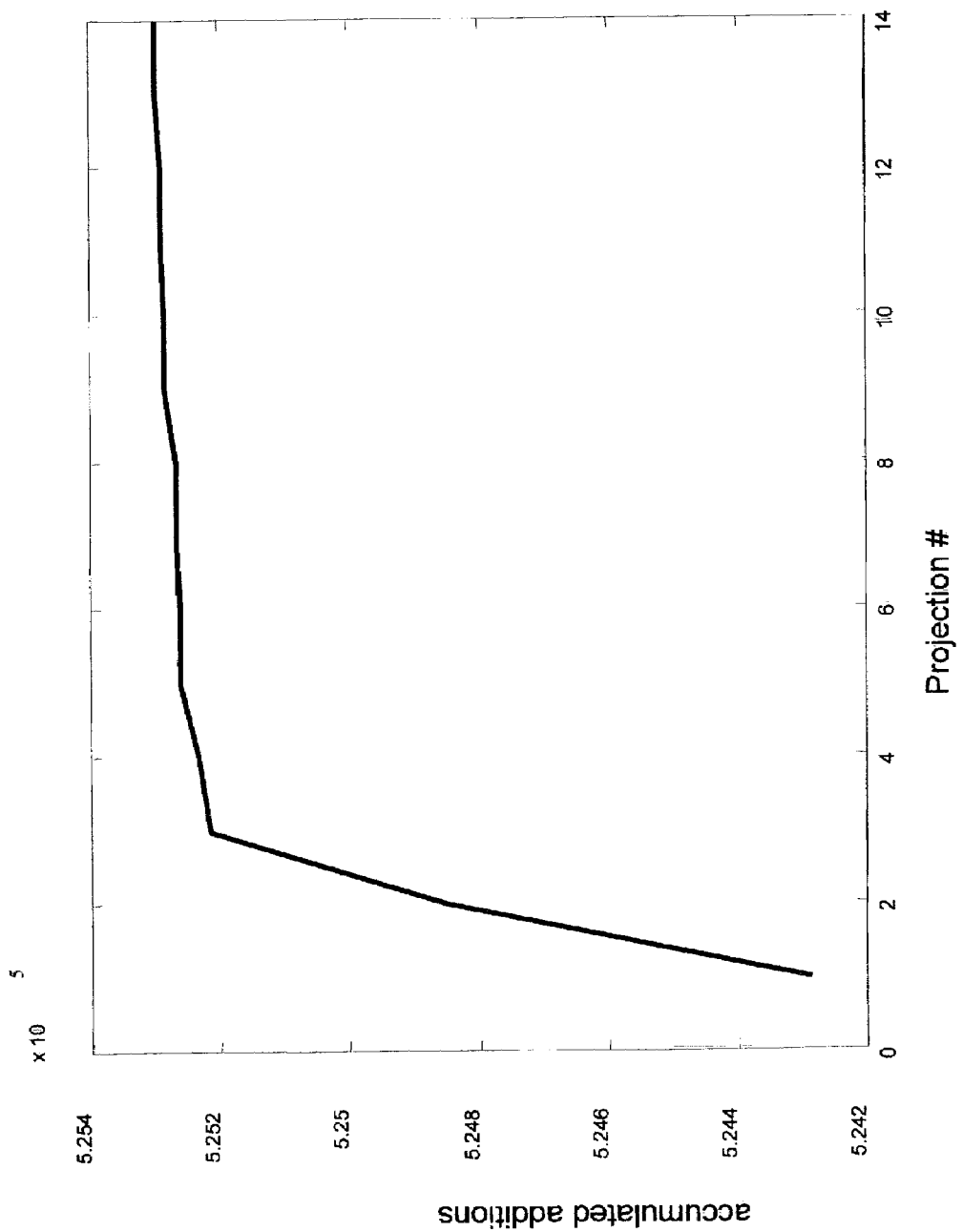
FIG. 14 is a graph showing the number of accumulated addition operations per projection.

Reference is now made to FIG. 14, which is a graph showing typical numbers of accumulated operations against the number of projections. Using the above results, an estimate of the average number of operations required per pixel can be calculated. FIG. 14 displays the accumulated number of operations (additions/subtractions) verses the number of projections. The average number of operations per pixel for the whole process is 8.0154 which is slightly over $2\log_2(16)$ as expected. It is immediately clear that elimination of most windows at the early projections means that the later, fewer projections are carried out at very little processing cost.

Run time comparison was performed between the naive approach, the Fourier approach, and a method based on the present embodiments for the above experiment using an image of size 1K×1K and patterns of size 16×16 and 32×32.

The experiments were performed on a PIII processor, 1.8 GHz. The average number of operations and run times are summarized in Table 2.

TABLE 2

A comparison between existing pattern matching approaches and the present embodiments.

|  | Naive | Fourier | Walsh-Hadamard |
|---|---|---|---|
| Average # operations per pixel | +: $2k^2$<br>*: $k^2$ | +: $36 \log n$<br>*: $24 \log n$ | +: $2 \log k + \epsilon$ |
| Space | $n^2$ | $N^2$ | $2 n^2 \log k$ |
| Integer Arithmetic | Yes | No | Yes |
| Run Time for 16 × 16 | 1.33 Sec. | 3.5 Sec | 54 Msec. |
| Run Time for 32 × 32 | 4.86 Sec. | 3.5 Sec. | 78 Msec. |
| Run Time for 64 × 64 | 31.30 Sec. | 3.5 Sec. | 125 Msec. |

Pattern Matching With Noise

Figure 15C:
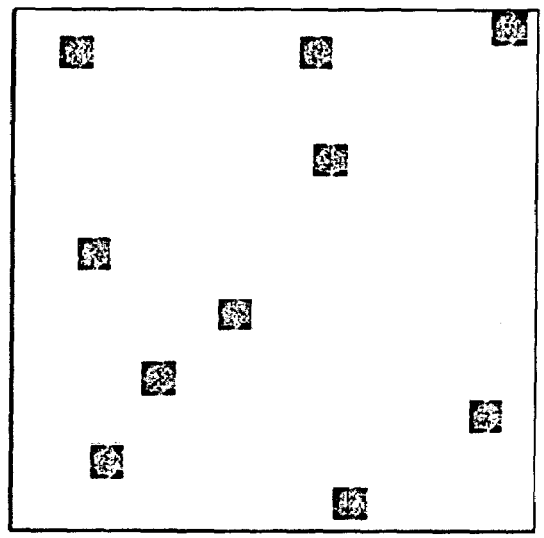
FIG. 15 is a set of three images, respectively from left to right a clean image, a noisy version of the clean image and patterns matched from the noisy image.
Figure 15B:
Figure 15A:
Figure 16:
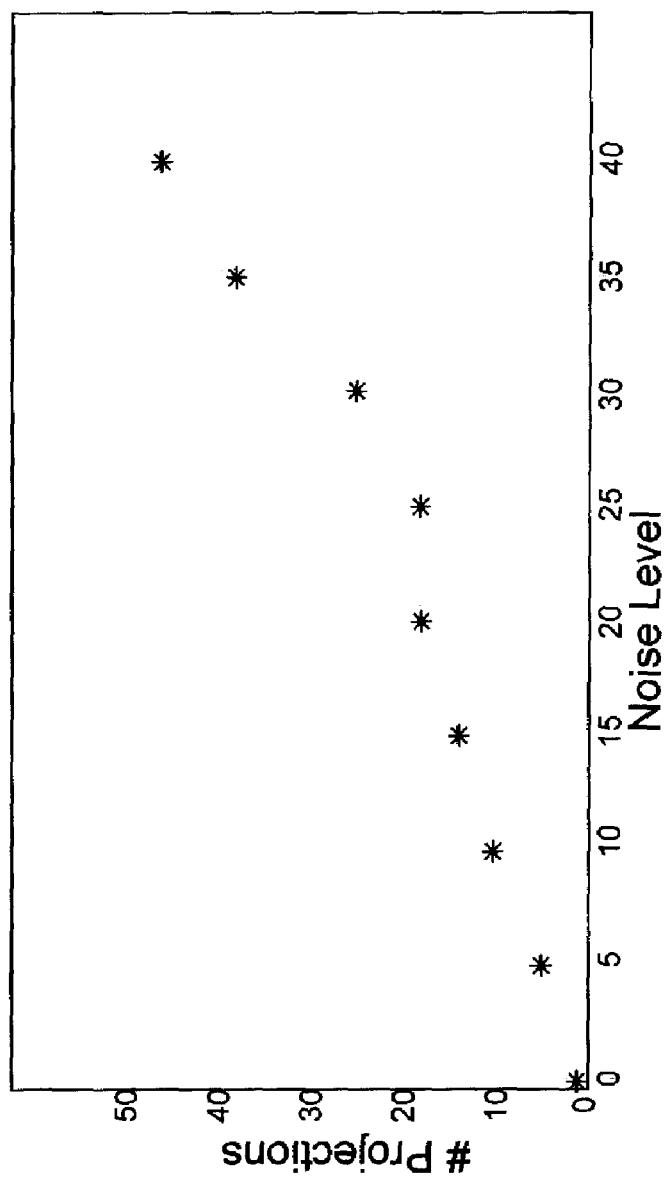
FIG. 16 is a graph showing image noise level against number of projections needed, demonstrating that for increased noise a larger number of projections are required.

Reference is now made to FIGS. 15a–c, which show an original image, FIG. 15a, subsequently contaminated with noise, FIG. 15b, and in FIG. 15c demonstrating the results of an experiment ending in successful identification of a pattern being searched for. The image situation depicted in FIG. 11 above is not typical. Usually the pattern being searched for is allowed some variation in appearance due to presence of noise in the image being searched. The noise may for example be due to, quantization, digitization and transformation errors. In the following experiment, images contain noisy versions of the pattern. FIG. 15a shows the original image which contains several embedded copies of a given pattern. FIG. 15b shows a noisy version of the image with noise level of 40 (i.e. each pixel value in the image was increased/decreased by at most 40 gray values). FIG. 15c shows that all 10 noisy patterns were detected even under these very noisy conditions. The pattern matching scheme as described above is adapted for noise very simply by raising the threshold for rejection of windows based on the projected distances. The primary effect of noise is that the distance between pattern and image increases, and attains a certain finite level even for perfect matches. Increasing the threshold above which images are rejected has the consequence that fewer image windows are rejected after each projection and that the overall number of required projections increases with the threshold. FIG. 16, to which reference is now made, graphically illustrates the above-described behavior over a range of noise levels. It is immediately clear that for a higher given noise level a larger number of projections is required. The minimum number of projections required to find all noisy patterns in a given image is shown as a function of the noise level. In all cases, the threshold used is the minimum value that produces no miss-detections. In practice, although in any particular case the number of miss-detections cannot be known the selection of a threshold value can be made based on knowledge of the application including a number of false negatives vs a number of false positives that are acceptable to the application. The chosen threshold also depends on the metric chosen (in the case of the above embodiments, Euclidean). If the user has an estimate of the model or parameters of the noise then the threshold can be determined automatically. At worst a certain amount of experimentation may be expected by the skilled person to arrive at a suitable threshold. Furthermore it will be appreciated that the threshold value and the number of projections required increase as the noise level increases.

Figure 17:
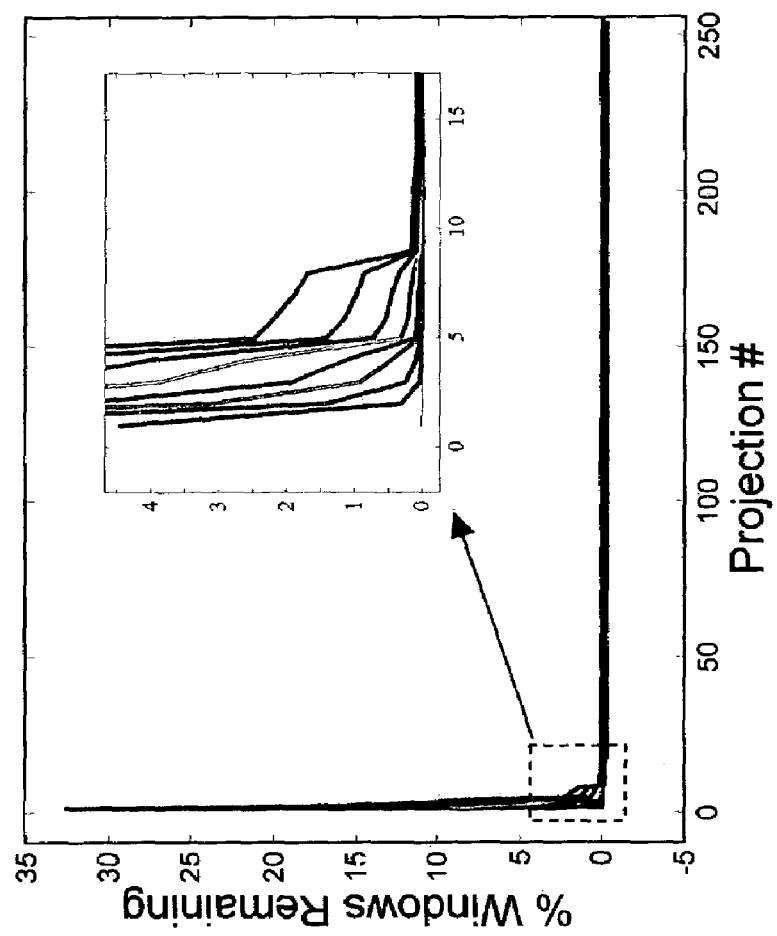
FIG. 17 is a graph showing the percentage of image windows remaining after each projection for the image shown in FIG. 15 at various noise levels.

Reference is now made to FIG. 17, which is a graph showing the percentage of image windows remaining after each projection, for images of varying noise levels. The images are of size 256×256 and the pattern of size 16×16. As the noise level increases, fewer windows are rejected after each projection, however the decreasing profile for the various thresholds is similar (FIG. 17 inset shows a scaled version of the values for the first few projections).

Figure 18:
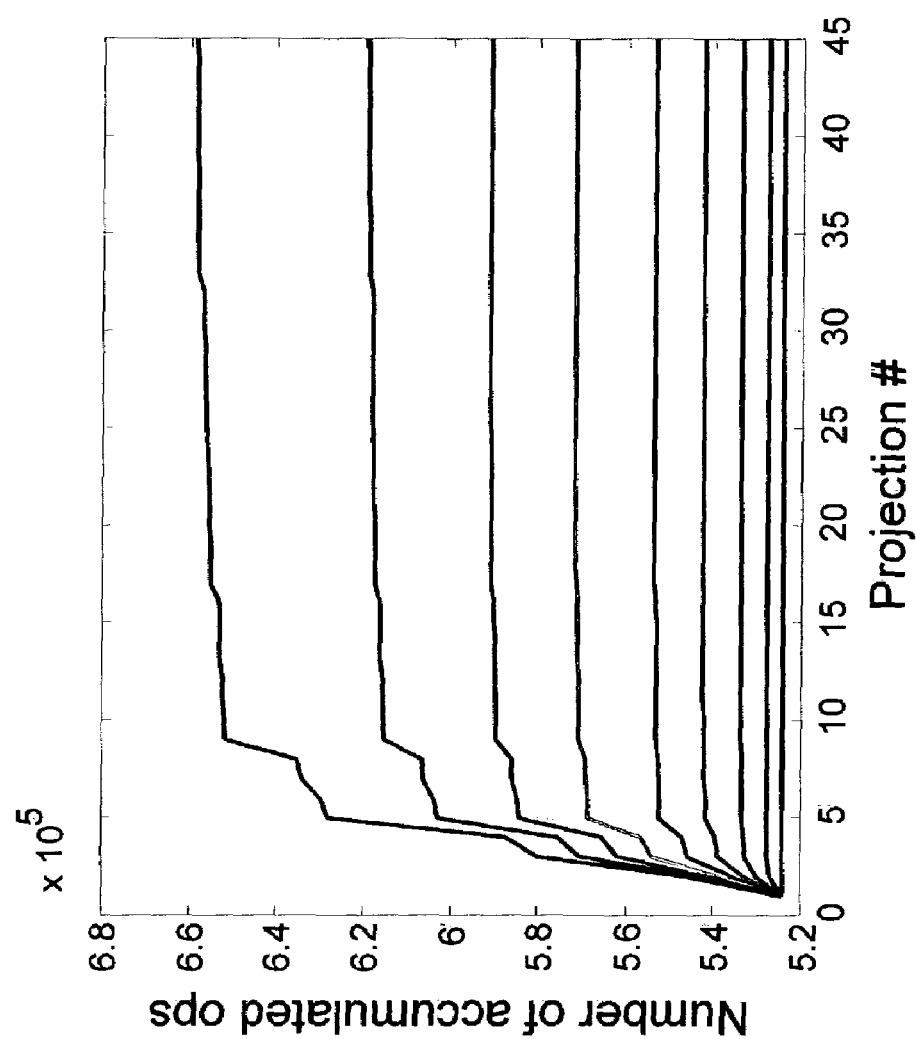
FIG. 18 is a graph showing the number of accumulated operations after each projection at various noise levels.

Reference is now made to FIG. 18, which is a graph showing the number of accumulated operations, including additions and subtractions, performed following each projection for various noise levels as per FIG. 15. The average number of operations per pixel at the maximal noise level is 10.0623, which is only slightly higher than the value obtained for non-noisy images of the same size, c.f. FIG. 14 above.

Computational Aspects

The pattern matching process involves three types of techniques for evaluating the distance between image windows and pattern. The computational advantage of each technique, depends on the number of non-rejected windows remaining, and on the position of the current projection kernel within the Walsh-Hadamard Tree. The first method is the direct distance calculation (DD), which evaluates the distance between the pattern and a given window using the naive Euclidean distance.

The DD method has the advantage that no further calculations, and thus no further projections, are required, since the distance is computed exactly, and thus, if used, it is always the last level of calculation. The DD approach however has the disadvantage that it is computationally expensive. The DD approach is preferable when very few image windows remain in the pattern matching process. At the other end of the scale, is the top-down approach (TD) where a full branch of the Walsh-Hadamard tree is explored from the root down to the current leaf. Using this approach, a projection value is calculated for all windows in the image providing lower bounds on the actual distances. However, many calculations can be spared since intermediate values in the computation are given from neighboring windows and from previous projections. Thus the current branch needs to be explored only from a node level that has not been explored during the previous projection calculations. The more levels that have to be explored the more expensive this approach. Since projection values are calculated for all windows, this approach is preferable in the earlier stages of the matching process, when a large portion of the windows still remain to be matched.

Figure 19A:
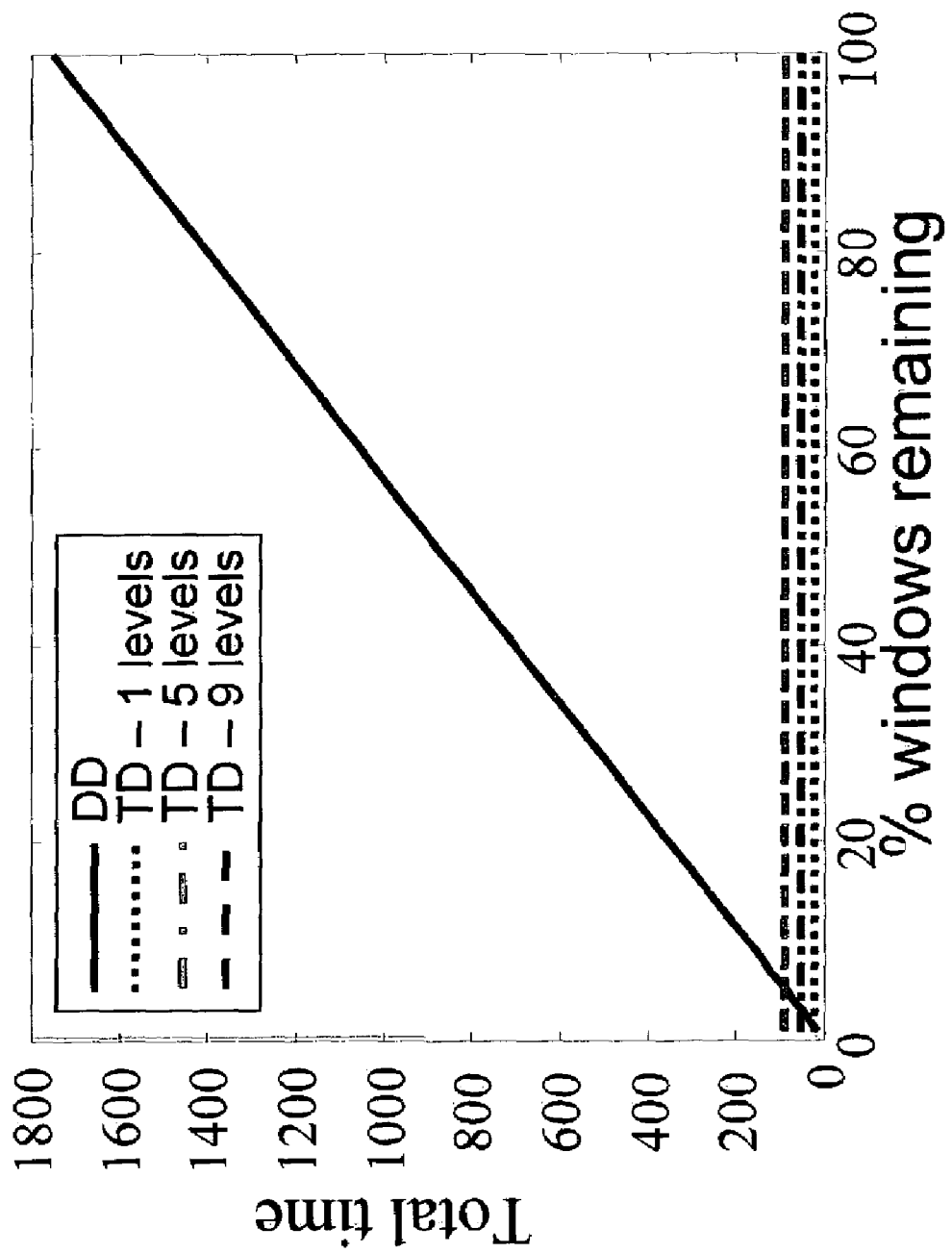
FIG. 19A is a graph showing computation time for the DD approach and for the TD approach at various projection levels.
Figure 19B:
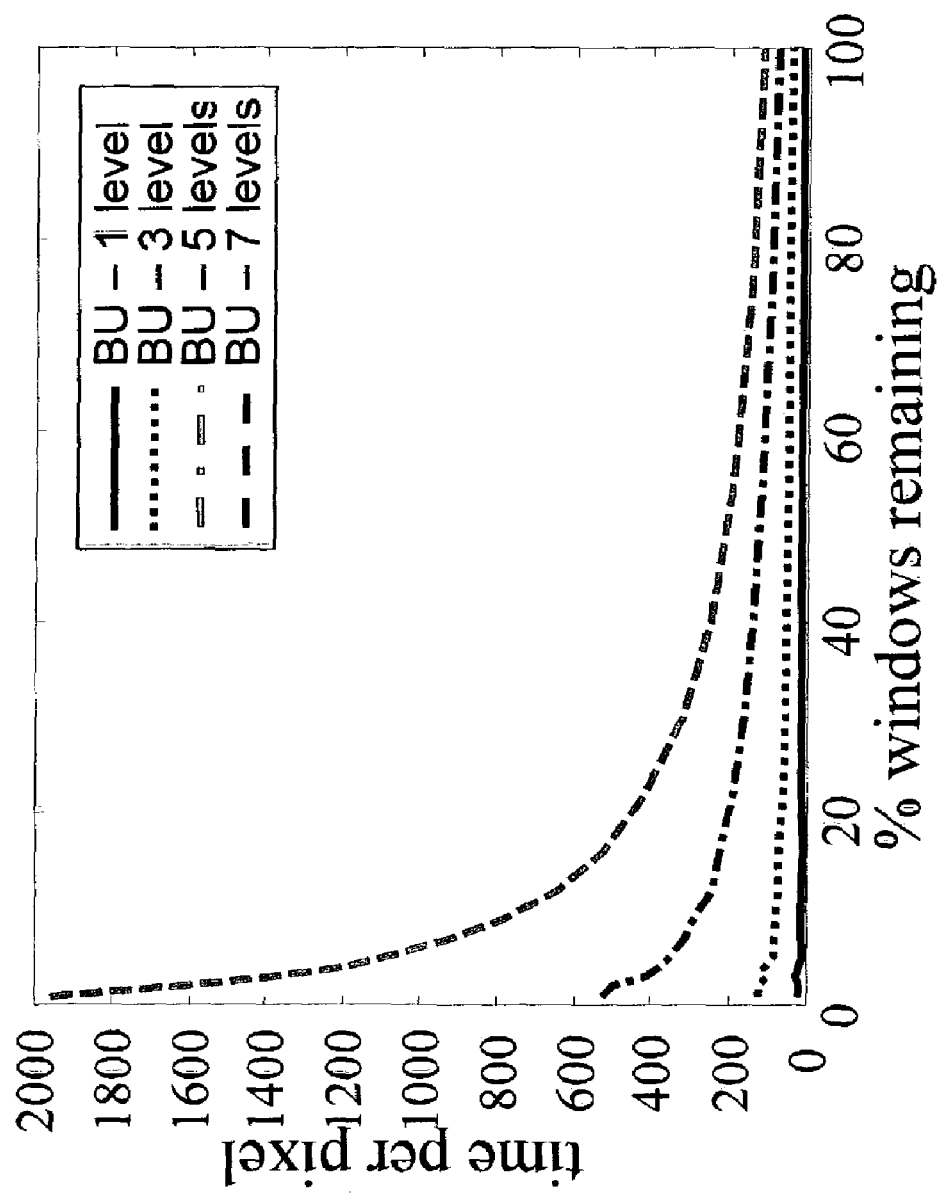
FIG. 19B is a graph showing computation time for the BU approach.

Reference is now made to FIGS. 19A and 19B. FIG. 19A is a graph which shows computation time for the DD and the TD approaches, v.s. the percentage of remaining windows. The time required for TD is given as separate graphs for various numbers of tree levels being explored. From the graph of FIG. 19A it can be seen that in the early stages when the percentage of remaining windows is greater than 4% it is preferable to use the TD approach, and in subsequent stages, it may be preferable to use the DD approach depending on the number of levels being explored. The third approach is the bottom-up method (BU), which computes the distance between windows and pattern by exploring only the necessary values within the tree, for each non-rejected window. Values are calculated recursively in a bottom-up manner from tree leaf up to the tree node whose values have already been computed, as discussed with respect to FIGS. 7 and 8.

Here too, exploiting previously explored values existing in the current branch, can greatly reduce computations. Using the BU method, the more windows that are evaluated, the greater the saving in computations, since intermediate values are common to neighboring windows. FIG. 19B shows the effect of such behavior, where average time per pixel rapidly declines as the percentage of remaining windows increases. Thus, the BU method is beneficial at intermediate stages, when a large portion of the windows has already been rejected, precisely when the TD approach is not beneficial, and yet more than a few windows still remain so that the DD approach is too expensive.

Figure 20A:
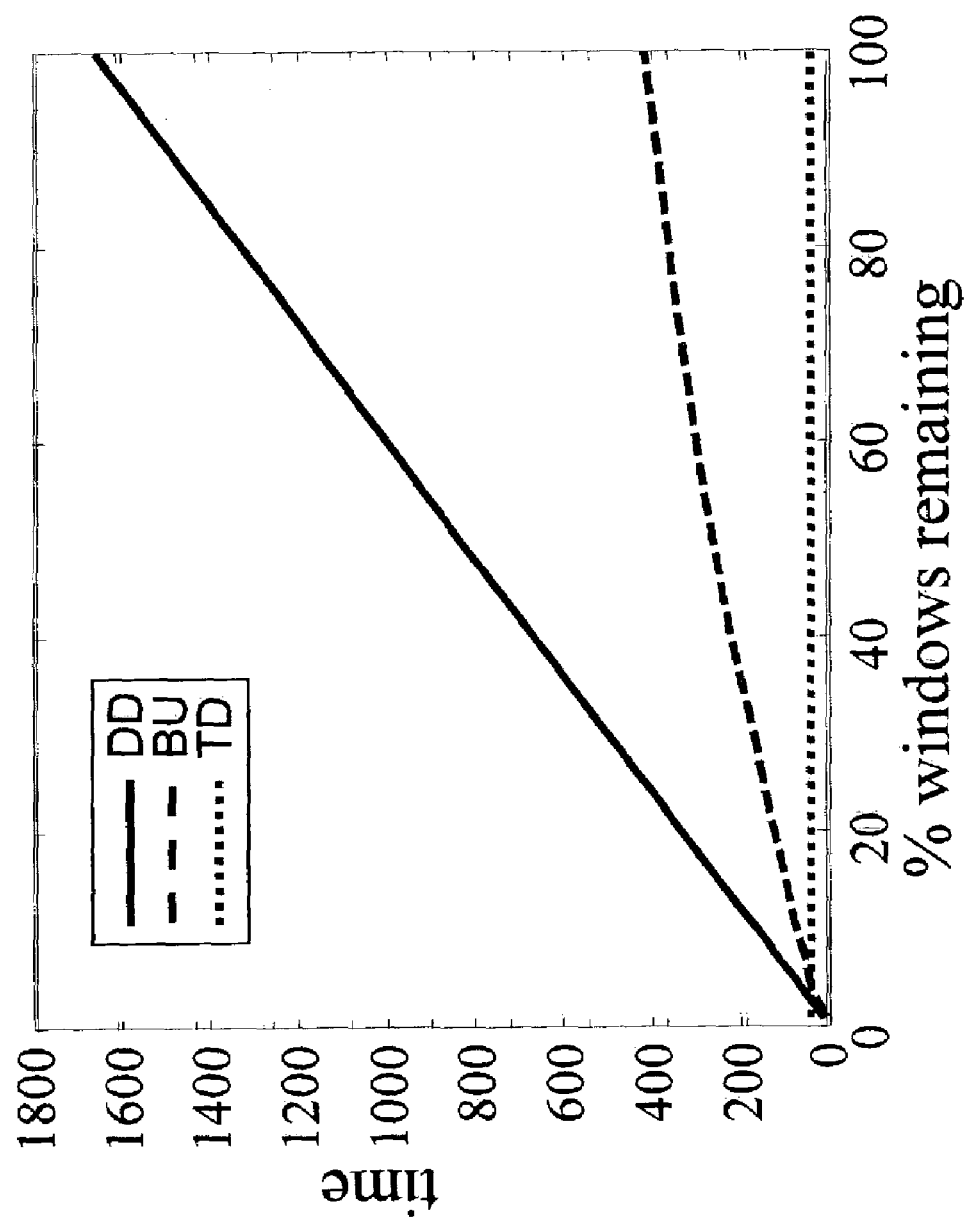
FIG. 20A is a graph showing the computation time for the TD, BU and DD approaches against percentage of remaining windows for three level projection.
Figure 20B:
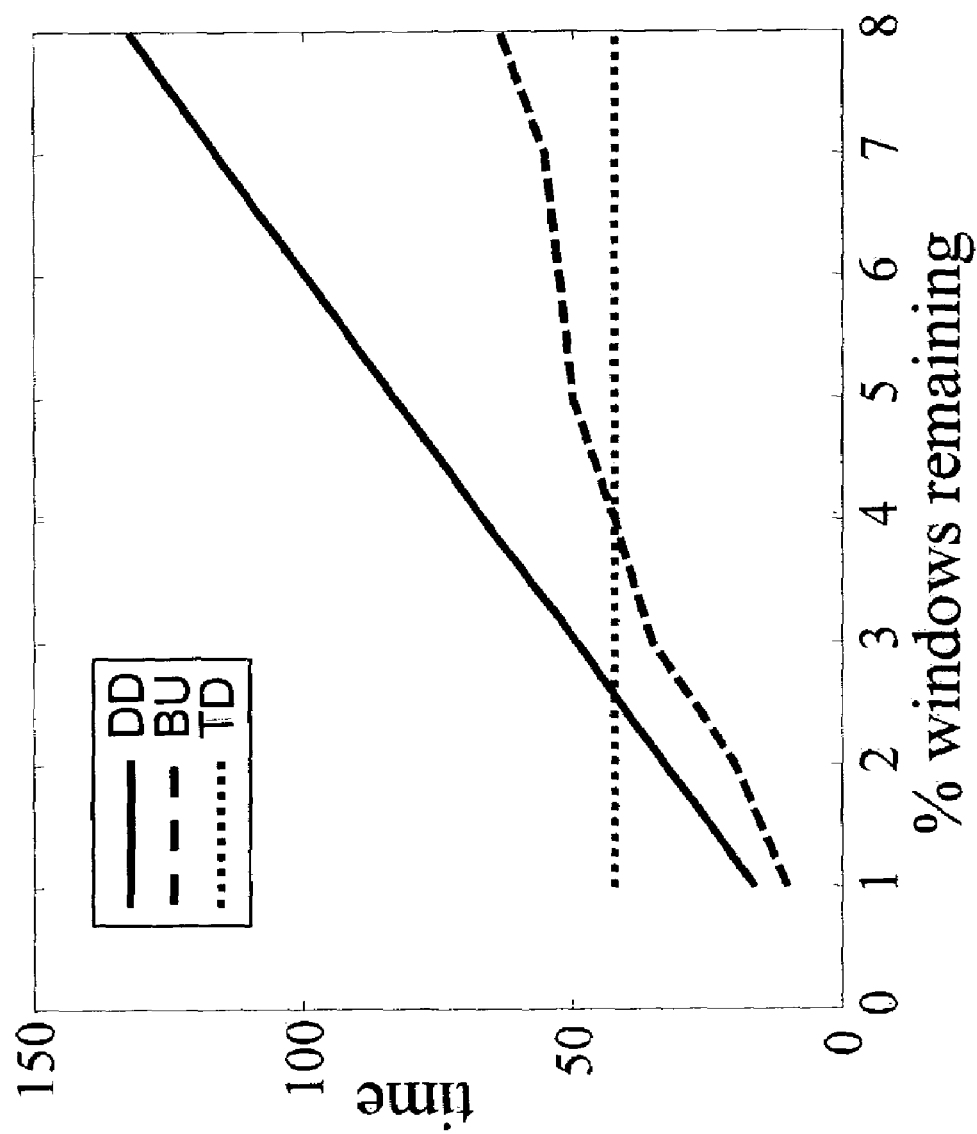
FIG. 20B is a scaled up version of the origin region of FIG. 20A.

Reference is now made to FIGS. 20A and 20B, which are the same graph showing the computation time for the TD, BU and DD approaches, vs. the percentage of remaining of windows when 3 levels of the branch are explored. FIG. 20B is simply an expansion of the origin region of FIG. 20A. In this case, it is preferable to apply the TD method when the remaining percentage of windows is greater than 4%. When fewer than 4% of the windows remain, the DD is the superior approach. Such a comparison can be designed for different cases depending on the number of levels. Table 3 summarizes which of the 3 methods should be used in each case, where a pattern of size 64×64 is sought in a 1k×1k image. The table depicts the percentage of remaining windows at which a method should be used (assuming TD is used initially with 100% of the windows). It is interesting to note that when traversal of a small number of levels is required (say up to 4 levels), it is preferable to use the TD method during the early stages and the BU method at later stages. If more than 5 levels are required, it is preferable to transfer directly from TD to DD. Only when 5 levels are required, it is advantageous to use all three methods depending on the remaining percentages of windows.

It is noted with respect to the above that the number of levels is dependent on the kernel which is currently being projected and its position in the tree.

TABLE 3

Pattern matching using 3 types of distance computations (TD, BU and DD - see text) in each case starting with TD, and then changing to BU or DD when indicated.

| # Levels | Use BU | Use DD |
|---|---|---|
| 1 | 10% | never |
| 2 | 7.5% | never |
| 3 | 5% | never |
| 4 | 1.8% | never |
| 5 | 1.2% | 0.6% |
| 6 | never | 1.0% |
| 7 | never | 1.2% |
| 8 | never | 1.4% |
| 9 | never | 1.6% |
| 10 | never | 1.8% |
| 11 | never | 2.0% |
| 12 | never | 2.2% |

The optimal mix of methods in any given case is dependent on the percentage of remaining windows and on the number of tree levels that need to be traversed to complete the computation. The percentage of remaining windows at which a method should be used is given for various numbers of levels (assuming TD is used initially with 100% of the windows). The values were determined experimentally where a pattern of size 64×64 was sought in a 1k×1k image.

Reference is now made to FIG. 21, which is a simplified diagram showing results when a brightness gradient is added to an image containing ten instances of a pattern to be identified. FIG. 21a shows the initial image containing the instances and FIG. 21b shows the same image with the brightness gradient applied thereto. The illumination gradient produces a large variance in the appearance of the different instances of the pattern in the image, which instances are shown in FIG. 21c, together with a template for the sought pattern shown above. Using the original Walsh-Hadamard approach the patterns were not detected. Even when using a very high threshold only 2 of the occurrences were detected and many false alarms resulted as well. However, repeating the experiment using a DC invariant pattern matching method managed to detect all 10 occurrences of the pattern using a small threshold and only 5 projections. FIG. 21d illustrates the occurrences as detected within the image.

Discussion

The pattern matching scheme of the above-described embodiments assume the Euclidean distance is used for measuring similarity between pattern and image. Under this assumption the present embodiments are advantageous over the existing naive schemes first and foremost due to the reduction in time, and complexity, of around 2 orders of magnitude (as shown in Table 2). The reduction in complexity is due to a number of factors:.

[2] The projection of an image window onto the Walsh-Hadamard basis kernels is characterized by a fast decay of the energy content in the coefficients [13].

[2] The transform coefficients (projection values) can be computed efficiently and incrementally using the tree structure described with respect to FIG. 7.

[2] The incremental computation and the concentration of energy in the first few transform coefficients, induces a fast rejection scheme where many image windows are rejected in early stages of the process.

[2] Independent of the rejection scheme is the fact that all computations of the transform coefficients are performed using integer additions and subtractions. Integer operations are much faster than floating point operations in most hardware [22].

In addition to the advantage in time complexity, the proposed scheme has the following additional advantages:

[2] It easily allows disregarding of the DC values from the pattern and all image windows. This can be used to compensate partially for illumination variations. The DC values of all windows in fact coincide with the values of the projection onto the first Walsh-Hadamard kernel. Thus the first branch of the Walsh-Hadamard tree, see FIG. 7, may be skipped and the process initialized by computing the projections onto the second kernel.

[2] The scheme easily allows incorporating multi-scale pattern matching, where a pattern at several scales is sought in the image. Under the Walsh-Hadamard tree scheme, matching patterns whose sizes are smaller than the original pattern by powers of 2, can be applied almost for free, since the appropriate Walsh-Hadamard kernels for these patterns are already given at the intermediate tree nodes. The reason is as explained in the following example. At the leaf node the values are the projections onto the DC kernel i.e. each value in the node is the sum of k pixels in a window. The node one level up contains values that are the sum of pixel values in windows of size k/2 (remember that the leaf node values are obtained by summing two such windows). At the next level up the values are sums of windows of size k/4 and so on up the branch. Thus in the intermediate nodes of the branch we have the DC value of windows of varying size OR the projection of smaller windows onto the DC kernel (of smaller size). This example extends to other projection vectors along other branches of the tree and we get projections of smaller windows onto the walsh-hadamard kernels.

² The method of the above described embodiments can be used in motion estimation and MPEG compression, where block-matching is required. Considering every window of the first image as a 'pattern', the task of block matching can be viewed as a pattern search where instead of a predefined constant threshold value, one uses a varying threshold. The threshold is initialized to a large enough value, and in subsequent stages is updated to be the distance to the window with the smallest lower bound. This threshold value decreases throughout the process as more similar windows are found for the pattern. The projected window values can serve as input features for classification. Using the projection methods discussed in this paper, features can be quickly extracted.

² The projection values of neighboring image windows tend to be similar and their differences can be bounded For example consider the first projection in 1D: given the projection at location x (say w(x) ) and since every pixel in the image is in [0.255], the neighboring window's projection value must be between w(x)−255 and w(x)+255 (because the kernels contain only +1). This fact directly relates to a lower/upper bound on w(x+1). This fact can be exploited in a multi-scale scheme, where only a fraction of the projection values are calculated and bounds (above and below) can be calculated for the missing values. The process may be repeated recursively to obtain a pattern-matching scheme with improved run time.

² The above described embodiments use the Euclidean norm. However the skilled person will appreciate that other distance measuring norms can be used. In principle, an extension to the $L_2$ norm can be achieved by applying the equivalence relation between norms, such that the $L_2$ norm forms lower and upper bounds when multiplied by specific constants [11].

² The above-described embodiments support matching of patterns whose size in pixels equals a power of 2. An extension of the approach to images of any size may be achieved using the general size Walsh-Hadamard basis [26].

The embodiments described above require more memory capacity than the naïve approaches. Naive approaches perform convolutions on the image, requiring the process to allocate and maintain memory size on the order of $n^2$ (the size of the image). The proposed approach maintains a branch of the Walsh-Hadamard tree at all times, requiring memory of size $2n^2\log_2 k$. However, considering the fact that floating memory is required for the naive approach and integer memory for the new approach and considering the typical scenario where k, the pattern size is relatively small compared to the image size, this increase in memory is acceptable.

Conclusion

A novel approach to pattern matching is presented, which reduces time complexity by 2 orders of magnitude compared to the traditional approaches. The suggested approach uses an efficient projection algorithm which allows the distance between a pattern and a window to be measured in the Walsh-Hadamard domain rather than the spatial domain. Rather than scanning the image windows and computing all projection values for each image, the suggested approach scans the projection vectors and for each vector projects all image windows. This allows the efficient projection algorithm to be combined with a rejection scheme. Thus, using relatively few projections, a large number of windows are rejected from further computations. Complexity of computation is reduced by using the Walsh-Hadamard tree structure which exploits computations performed for a given projection vector, in the computations performed for the following vector. Additionally, projection computations performed on one window are exploited in the projection computations of the neighboring windows. Experiments show that the approach is efficient even under very noisy conditions. This approach can be implemented in a signal domain of any dimension as long as projection vectors of the required dimension are available.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

Attached are two appendices, A and B. Appendix A gives the mathematical derivation for providing a distance lower bound using a projection vector, and appendix B gives the mathematical derivation for a distance lower bound using a set of projection vectors.

APPENDIX

A. Distance Lower Bound for a Single Projection Vector

Lemma 1 Given three vectors in $R^n$: p, w, and a unit vector u. The Euclidean distance between p and w satisfies the following:

$$d_E(p; w) \geq d_E(u^T p; u^T w) \quad (1.4)$$

Proof: Define d=p−w. Using Cauchy-Schwartz inequality for norms it follows that:

$$\|u\|\,\|d\| \geq \|u^T d\|$$

Since $\|u\|=1$, this implies:

$$\|p-w\| \geq \|u^T(p-w)\| = \|u^T p - u^T w\|$$

Since the distance $d_E(x; y)$ is the Euclidean norm of (x−y) we have:

$$d_E(p; w) \geq d_E(u^T p; u^T w)$$

B Distance Lower Bound for a Set of Projection Vectors

Lemma 2 Given is the following linear system with the unknown vector d:

$$\begin{pmatrix} U^T \\ v^T \end{pmatrix} d = \begin{pmatrix} b \\ \alpha \end{pmatrix} \quad (2.5)$$

where U is an n×k orthonormal matrix, such that $U^T U = I_k$, v and d are n dimensional vectors, b is a k dimensional vector, and a is a scalar. The norm-2 of d is bounded from below:

$$d^T d \geq b^T b + 1/\gamma^2 (\alpha - v^T U b)^2$$

where $\gamma = \|v - UU^T v\|$

Proof: Let Range(U) and Null(U) be the column space and the null space of U, respectively.

The projection of vector v onto Null(U) is:

$$v_N = v - UU^T v \quad (2.6)$$

so that $U^T v_N = 0$. Dividing $v_N$ by its norm $\gamma = \|v_N\|$, yields the normalized vector:

$$\hat{v}_N = v_N/\gamma$$

Using Equation 2.6 it is easily verified that:

$$(U \; v) = (U \; \hat{v}_N) \begin{pmatrix} I & U^T v \\ 0 & \gamma \end{pmatrix}$$

Note however that $[U \; \hat{v}_N]$ is orthonormal, i.e. $[U \; \hat{v}_N] = I$. Rewriting Equation 2.5 using the above relation yields:

$$(U \; v)^T d = \begin{pmatrix} I & 0 \\ v^T U & \gamma \end{pmatrix} \begin{pmatrix} U^T \\ \hat{v}_N^T \end{pmatrix} d = \begin{pmatrix} b \\ \alpha \end{pmatrix}$$

However, since:

$$(U \; v)^T d = \begin{pmatrix} I & 0 \\ v^T U & 1 \end{pmatrix} \begin{pmatrix} I & 0 \\ v^T U & \gamma \end{pmatrix} = I$$

It is straightforward to see that:

$$\begin{pmatrix} U^T \\ \hat{v}_N^T \end{pmatrix} d = \frac{1}{\gamma} \begin{pmatrix} \gamma I & 0 \\ -v^T U & 1 \end{pmatrix} \begin{pmatrix} b \\ \alpha \end{pmatrix}$$

Since $[U \; \hat{v}_N]$ is orthonormal, the minimum norm-2 solution for d gives [11]:

$$\tilde{d} = \frac{1}{\gamma}(U \; \hat{v}_N) \begin{pmatrix} \gamma I & 0 \\ -v^T U & 1 \end{pmatrix} \begin{pmatrix} b \\ \alpha \end{pmatrix} = (U \; \hat{v}_N) \begin{pmatrix} b \\ (\alpha - v^T U b)/\gamma \end{pmatrix}$$

and as such yields:

$$d^T d \geq \tilde{d}^T \tilde{d} = (b^T(\alpha - v^T U b)/\gamma) \begin{pmatrix} U^T \\ \hat{v}_N^T \end{pmatrix} (U \; \hat{v}_N) \begin{pmatrix} b \\ (\alpha - v^T U b)/\gamma \end{pmatrix}$$

However, since $[U \; \hat{v}_N]$ is orthonormal it gives:

$$d^T d \geq b^T b + 1/\gamma^2 (\alpha - v^T U b)^2$$

What is claimed is:

1. Pattern matching apparatus for comparing signal samples with a pattern to find signal samples substantially matching said pattern, the apparatus comprising:
   a projector for projecting said signal samples over a single rooted tree of projection vectors of successively increasing frequency at nodes of said tree to successively provide projection values,
   a distance measurer, associated with an output of said projector for determining a distance between said projection value and a corresponding projection value of said pattern, said distance being an expression of a minimum bound of a true distance between said sample and said pattern, and
   a thresholder, associated with an output of said distance measurer for applying a threshold to said minimum bound to successively reject samples at respective nodes.

2. The pattern matching apparatus of claim 1, wherein said tree of projection vectors comprises successively mutually orthogonal vectors.

3. The pattern matching apparatus of claim 2, wherein said tree is configured to describe a Windowed Walsh Hadamard transformation.

4. The pattern matching apparatus of claim 1, wherein said tree of projection vectors comprises a branched arrangement of nodes extending from a single root, such that nodes are arranged to have parent nodes and child nodes, each node representing a different projection, and wherein said projector comprises a memory for storing a projection at a parent node until all child node projections have been calculated.

5. The pattern matching apparatus of claim 4, wherein said projector is configured to recursively descend said tree from root to leaf, skipping nodes that have already been computed.

6. The pattern matching apparatus of claim 4, wherein said projector is configured to recursively ascend said tree from a node for which a projection is required to said root to restrict calculations to signal values needed for said node for which a projection is required.

7. The apparatus of claim 4, wherein said projector is further configured to descend a first branch of said tree and traverse remaining leaves of said tree.

8. The pattern matching apparatus of claim 1, wherein said projection vectors are one-dimensional projection vectors.

9. The pattern matching apparatus of claim 1, wherein said projection vectors are two-dimensional projection vectors.

10. The pattern matching apparatus of claim 1, wherein said projection vectors are at least three-dimensional projection vectors.

11. The pattern matching apparatus of claim 1, wherein said substantially matching comprises incorporating noise tolerance, thereby to match a noisy signal to said pattern.

12. The pattern matching apparatus of claim 11, wherein said tolerance to noise is provided by increasing said threshold level in said thresholder.

13. The pattern matching apparatus of claim 11, wherein said distance measurer is configured to calculate a direct distance between said signal sample and said pattern when said signal sample is one of a small percentage of remaining samples following rejection of all other samples.

14. The pattern matching apparatus of claim 1, wherein said distance measurer is configured to use a Euclidian distance calculation.

15. The pattern matching apparatus of claim 1, wherein said distance measurer is configured to use an L1 norm distance calculation.

16. The pattern matching apparatus of claim 1, wherein a first branch of said tree comprises DC level information, and wherein said projector is configurable to skip said first branch in order to disregard said DC level information in said pattern matching.

17. The pattern matching apparatus of claim 1, wherein said projector is configurable to calculate projection values or minimum distance bounds for a subset of signal samples and to use said calculated values to provide estimates of projection values or minimum distance bounds for signal samples that neighbor samples within said subset.

18. The apparatus of claim 1, wherein said projector is further configured to reorder said projection vectors, so as to enhance performance of said thresholder.

19. The apparatus of claim 1, wherein said projection vectors are orthogonal.

20. A method of matching between a pattern and at least part of an input signal comprising:
projecting said pattern onto a first projection vector to form a pattern projection value, using a first branch of a single rooted tree of projection vectors of successively increasing frequency;
projecting said at least part of an input signal onto said first projection vector to form an input signal projection value;
calculating a distance between said pattern projection value and said input signal projection value; and
rejecting said at least part of an input signal as a non-match if said distance exceeds a predetermined threshold.

21. The method of claim 20 comprising:
taking a non-rejected part of said input signal, projecting said pattern and said non-rejected part of said input signal onto a second projection vector to said first projection vector, to form a second pattern projection value and a second input signal projection value;
calculating a distance between said pattern projection value and said input signal projection value; and
rejecting said non-rejected part of an input signal as a non-match if said distance exceeds a predetermined threshold.

22. The method of claim 21, further comprising repeating the stages of claim 17 a predetermined number of times or until the number of remaining un-rejected windows reaches a predefined value.

23. The method of claim 21, wherein said projection vectors comprise Walsh Hadamard basis vectors arranged in order of successively increasing frequency.

24. The method of claim 23 wherein said input signal is a one-dimensional signal and said projection vectors are one-dimensional basis vectors.

25. The method of claim 23 wherein said input signal is a two-dimensional image and said projection vectors are two-dimensional basis vectors.

26. The method of claim 23 wherein said input signal is a three-dimensional image and said projection vectors are three-dimensional basis vectors.

27. The method of claim 23 wherein said input signal is at least a four-dimensional signal and said projection vectors are at least four-dimensional basis vectors.

28. The method of claim 23, wherein said projection vectors are arranged in a tree structure having branches and nodes such that projection vectors share branches and nodes of said tree structure, said arrangement representing projection calculations, such that respective shared nodes of said tree structure allow sharing of projection calculations between projection vectors.

29. The method of claim 20, comprising taking a plurality of windows of said input signal and projecting all of said windows together onto said projection vector to calculate a projection value and a distance for each window, thereby to reject any window having a distance exceeding said predetermined threshold.

30. Pattern matching apparatus for comparing signal samples with a pattern to find signal samples substantially matching said pattern, the apparatus comprising:
a projector for projecting said signal samples over a single rooted tree of projection vectors of successively increasing frequency at nodes of said tree to successively provide projection values,
a distance measurer, associated with an output of said projector for determining a distance between said projection value and a corresponding projection value of said pattern, said distance being an expression of a minimum bound of a true distance between said sample and said pattern, and
a thresholder, associated with an output of said distance measurer for applying a threshold to said minimum bound to successively reject samples at respective nodes, wherein said tree of projection vectors comprises a branched arrangement of nodes extending from a single root, such that nodes are arranged to have parent nodes and child nodes, each node representing a different projection, and wherein said projector comprises a memory for storing a projection at a parent node until all child node projections have been calculated, and said projector is configured to recursively descend said tree from root to leaf, skipping nodes that have already been computed.

31. Pattern matching apparatus for comparing signal samples with a pattern to find signal samples substantially matching said pattern, the apparatus comprising:
a projector for projecting said signal samples over a single rooted tree of projection vectors of successively increasing frequency at nodes of said tree to successively provide projection values,
a distance measurer, associated with an output of said projector for determining a distance between said projection value and a corresponding projection value of said pattern, said distance being an expression of a minimum bound of a true distance between said sample and said pattern, and
a thresholder, associated with an output of said distance measurer for applying a threshold to said minimum bound to successively reject samples at respective nodes, wherein a first branch of said tree comprises DC level information, and wherein said projector is configurable to skip said first branch in order to disregard said DC level information in said pattern matching.

32. Pattern matching apparatus for comparing signal samples with a pattern to find signal samples substantially matching said pattern, the apparatus comprising:
- a projector for projecting said signal samples over a single rooted tree of projection vectors of successively increasing frequency at nodes of said tree to successively provide projection values,
- a distance measurer, associated with an output of said projector for determining a distance between said projection value and a corresponding projection value of said pattern, said distance being an expression of a minimum bound of a true distance between said sample and said pattern, and
- a thresholder, associated with an output of said distance measurer for applying a threshold to said minimum bound to successively reject samples at respective nodes, wherein said projector is configurable to calculate projection values or minimum distance bounds for a subset of signal samples and to use said calculated values to provide estimates of projection values or minimum distance bounds for signal samples that neighbor samples within said subset.

33. A method of matching between a pattern and at least part of an input signal comprising:
- projecting said pattern onto a first projection vector to form a pattern projection value, using a first branch of a single rooted tree of projection vectors of successively increasing frequency;
- projecting said at least part of an input signal onto said first projection vector to form an input signal projection value;
- calculating a distance between said pattern projection value and said input signal projection value;
- rejecting said at least part of an input signal as a non-match if said distance exceeds a predetermined threshold;
- taking a non-rejected part of said input signal, projecting said pattern and said non-rejected part of said input signal onto a second projection vector to said first projection vector, to form a second pattern projection value and a second input signal projection value;
- calculating a distance between said pattern projection value and said input signal projection value; and
- rejecting said non-rejected part of an input signal as a non-match if said distance exceeds a predetermined threshold.

* * * * *